(12) United States Patent
Alfonsi

(10) Patent No.: US 9,206,784 B2
(45) Date of Patent: Dec. 8, 2015

(54) HIGH-PERFORMANCE TURBINE WITH INCREASED SPECIFIC POWER

(76) Inventor: Giancarlo Alfonsi, Milan (IT)

( * ) Notice: Subject to any disclaimer, the term of this patent is extended or adjusted under 35 U.S.C. 154(b) by 695 days.

(21) Appl. No.: 13/505,077

(22) PCT Filed: Nov. 2, 2010

(86) PCT No.: PCT/EP2010/066624
§ 371 (c)(1),
(2), (4) Date: Apr. 30, 2012

(87) PCT Pub. No.: WO2011/057915
PCT Pub. Date: May 19, 2011

(65) Prior Publication Data
US 2012/0213630 A1    Aug. 23, 2012

(30) Foreign Application Priority Data
Nov. 13, 2009   (IT) .............................. MI2009A1997

(51) Int. Cl.
*F03B 3/08* (2006.01)
*F03B 3/16* (2006.01)
(Continued)

(52) U.S. Cl.
CPC ... *F03B 3/08* (2013.01); *F01D 1/14* (2013.01); *F03B 3/16* (2013.01); *F03B 11/02* (2013.01);
(Continued)

(58) Field of Classification Search
CPC ................ F03B 3/08; F03B 3/16; F03B 3/18; F03B 3/186; F03B 11/002; F03B 11/02; F03D 3/04; F03D 3/0409; F03D 3/0427; F05B 2240/133; F05B 2240/217
USPC .............. 415/2.1, 3.1, 4.2, 4.4, 905, 906, 907
See application file for complete search history.

(56) References Cited

U.S. PATENT DOCUMENTS 5,852,331 A * 12/1998 Giorgini ........................... 290/55
5,895,201 A * 4/1999 Huovinen ...................... 415/2.1
(Continued)

FOREIGN PATENT DOCUMENTS

CH            86082       8/1919
DE        10227426 C1     7/2003
(Continued)

OTHER PUBLICATIONS
International Search Report; International Application No. PCT/EP2010/066624; International Filing Date Nov. 2, 2010; Mail date Feb. 28, 2011.
(Continued)

*Primary Examiner* — Craig Kim
*Assistant Examiner* — Jason Davis
(74) *Attorney, Agent, or Firm* — Cantor Colburn LLP

(57) ABSTRACT

A high-performance turbine, particularly with increased specific power, including a rotor and a distribution apparatus which is adapted to convey a fluid stream onto the elements of the rotor for the rotation of the rotor about its own rotation axis, where the rotor includes a plurality of thrust ducts adapted to receive the fluid stream conveyed by the distribution apparatus to generate a rotary thrust on the surrounding walls of the thrust ducts, the turbine further including at least one slot, which is formed on the walls of the thrust ducts and/or of the distribution apparatus and is adapted to connect the fluid stream to the outside environment of the turbine, where at least one of the thrust ducts and the distribution apparatus crossed by the fluid stream includes at least one portion that converges in the direction in which the fluid stream travels, which is defined upstream of the slot in the direction of travel of the fluid stream for the at least local lowering of the pressure inside the thrust ducts and/or the distribution apparatus, which are crossed by the fluid stream, below the value of the pressure of the filling fluid of the outside environment, with consequent suction of the filling fluid into the thrust ducts and/or the distribution apparatus which are crossed by the fluid stream.

12 Claims, 9 Drawing Sheets

(51) Int. Cl.
*F03D 3/04* (2006.01)
*F03D 3/06* (2006.01)
*F01D 1/14* (2006.01)
*F03B 11/02* (2006.01)

(52) U.S. Cl.
CPC .......... *F03D 3/0427* (2013.01); *F05B 2240/13* (2013.01); *F05B 2240/217* (2013.01); *Y02E 10/223* (2013.01); *Y02E 10/226* (2013.01); *Y02E 10/74* (2013.01)

(56) References Cited

U.S. PATENT DOCUMENTS 7,834,477 B2 * 11/2010 Sheikhrezai .............. 290/55
7,866,938 B2 * 1/2011 Kariya .................... 415/4.4

FOREIGN PATENT DOCUMENTS

| FR | 843638 A | 2/1938 |
| GB | 2013790 A | 8/1973 |
| WO | 2006089425 A1 | 8/2006 |

OTHER PUBLICATIONS

Italian Search Report and Written Opinion; Italian Application No. IT MI20091997; Dated Jun. 30, 2010.

Written Opinion; International Application No. PCT/EP2010/066624; International Filing Date Nov. 2, 2010; Mail date Feb. 28, 2011.

* cited by examiner

HIGH-PERFORMANCE TURBINE WITH INCREASED SPECIFIC POWER

TECHNICAL FIELD

The present invention relates to a high-performance turbine, particularly with increased specific power.

BRIEF DISCUSSION OF RELATED ART

In the background art there are different types of turbines that can be distinguished mainly into impulse turbines, in which the pressure of the flow does not change during the process of interaction between the fluid and the elements of the rotor (an example of a turbine of this type is the Pelton turbine, in which the pressure of the flow remains always equal to the external atmospheric value), and into reaction turbines, in which instead the pressure of the flow varies during the process of interaction between the fluid and the elements of the rotor (examples of turbines of this type are the Francis turbine and the Kaplan turbine).

Regardless of the constancy, or lack thereof, of the pressure of the flow during the process of interaction between the fluid and the elements of the turbine rotor, another characteristic by means of which one distinguishes turbines of the known type is the main direction that the fluid flow follows once it makes contact with the rotor.

In fact, depending on the main direction followed by the fluid flow once in contact with the rotor, it is possible to distinguish radial-flow turbines (i.e., when the fluid flow moves mainly in the rotational plane of the rotor from a certain distance from the rotation axis of the rotor, at the intake section, to another distance, at the outlet section, such as, for example, in the Francis turbine), axial-flow turbines (i.e., when the fluid flow moves mainly in a direction which is parallel to the rotation axis of the rotor, such as, for example, in the Kaplan turbine) and mixed-flow turbines (i.e., when the fluid flow moves partly in a radial direction and partly in an axial direction).

In a final possible classification of turbines of the known type, that is made depending on the type of fluid treated, the same turbines can be distinguished into hydraulic turbines, steam turbines, gas turbines and wind turbines.

More particularly, in hydraulic turbines a water flow is directed toward a rotor so as to turn it and be able to generate electric power from an alternator connected to the shaft, as occurs in a hydropower plant. The water flow, which is free and at atmospheric pressure, in the case of Pelton turbines, or ducted and at a higher pressure than the outside environment, in the case of Francis turbines and Kaplan turbines, arrives from a pressure pipe that is supplied in general by an artificial body of water usually created by a dam. The energy of the flow in the pressure pipe, minus the load losses, is partly pressure energy and partly kinetic energy. In the case of Francis turbines and Kaplan turbines, the flow, at the end of the pressure pipe, is directed toward the rotor by means of a further duct, and thus with an energy load that is again partly pressure energy and partly kinetic energy. In the case of Pelton turbines, the pressure pipe ends with a nozzle for exit into the atmosphere and thus, at the nozzle, the energy of the flow is completely converted into kinetic energy alone. Then the same flow is directed toward the turbine. Thus, in this last case, the energy of the flow that interacts with the rotor of the turbine is of an exclusively kinetic type.

In steam turbines the value of the pressure of the fluid, distinctly higher than the external pressure, that is necessary for the operation of the apparatus, is reached by introducing into the circuit heat that arrives from a boiler in which a fuel is burned, such as, for example, in a thermoelectric power station or nuclear thermal power station.

In gas turbines the high pressure values, much higher than the external pressure, that are necessary for the operation of the apparatus, are reached by means of a chemical reaction that involves a fuel and air in a combustion chamber, such as, for example, in a reaction engine.

In wind turbines a wind flow which is at atmospheric pressure and thus has only kinetic energy turns the blades connected to a shaft, where the latter is connected in turn to the rotor of an alternator.

In general, in all existing types of turbines it is possible to distinguish an intake section of the control volume on the surrounding elements of which the thrust of the fluid, be it in the liquid state or in the gaseous state, is discharged, and an outlet section of the same control volume.

As is known, the geometric dimensions of the intake section of the control volume, i.e., the area "A", and the average value on the section of the velocity "V" of the incoming fluid, determine the fluid flow rate "Q", understood to be the volume per unit time that enters the machine, according to the known law provided below:

$$Q=VA$$

If the density of the fluid "$\rho$" is not constant, one speaks of mass per unit time and determination is performed according to the known law provided below:

$$Q=\rho VA$$

In all existing turbines, at each preset point of operation of the machine, the fluid flow rate remains constant between the intake section and the outlet section of said machine.

Therefore, since the power of the flow at the intake section of the machine is equal to:

$$P_{corrente}=\tfrac{1}{2}\rho QV^2$$

and since the mechanical power that can be obtained at the shaft of said turbine and thus can be used is equal to:

$$P_{turbina}=\eta\tfrac{1}{2}\rho QV^2$$

where "$\eta$" is the efficiency of the machine, it is clear that the mechanical power that can be obtained at the shaft of a turbine depends not only on the density of the fluid that is used and minus the efficiency of the apparatus, but also on the characteristic values of the flow in input to the machine, i.e., on the flow-rate "Q" and the average velocity "V".

Thus, for example, the provision of high-power turbines involves necessarily raising the values of the intake flow-rate or of the average velocity of the intake flow or of both of these quantities.

This entails the provision of large plants, with consequent high production, installation and management costs, as well as naturally the actual availability of high values of fluid flow rates and of velocity of the flow to be introduced in the machines, with corresponding high operating costs.

Consider, for example, the cost of the fuel that is burned to operate a large thermoelectric plant in which the alternator is moved by a steam turbine.

BRIEF SUMMARY

The aim of the present invention is to provide a high-performance turbine that makes it possible to obtain increased specific power levels, for equal overall dimensions, if compared to those of turbines of a known type.

Within this aim, the invention provides a high-performance turbine that can work both with fluids in the liquid state and fluids in the gaseous state, as well as with mixed fluids, i.e., fluids that have a component in the liquid state and a component in the gaseous state.

This aim is achieved by a high-performance turbine, particularly with increased specific power, comprising a rotor and a distribution apparatus which is adapted to convey a fluid stream onto the elements of said rotor for the rotation of said rotor about its own rotation axis, said rotor comprising a plurality of thrust ducts adapted to receive said fluid stream conveyed by said distribution apparatus to generate a rotary thrust on the surrounding walls of said thrust ducts, characterized in that it comprises at least one slot, which is formed on the walls of said thrust ducts and/or of said distribution apparatus and is adapted to connect said fluid stream to the outside environment of the turbine, at least one of said thrust ducts and said distribution apparatus crossed by said fluid stream comprising at least one portion that converges in the direction in which said fluid stream travels, which is defined upstream of said at least one slot in the direction of travel of said fluid stream for the at least local lowering of the pressure inside said thrust ducts and/or said distribution apparatus, which are crossed by said fluid stream below the value of the pressure of the filling fluid of said outside environment, with consequent suction of said filling fluid into said thrust ducts and/or said distribution apparatus, which are crossed by said fluid stream.

BRIEF DESCRIPTION OF THE DRAWINGS

Further characteristics and advantages of the present invention will become better apparent from the description of two preferred but not exclusive embodiments of a high-performance turbine, particularly with increased specific power, according to the invention, illustrated by way of non-limiting example in the accompanying drawings, wherein.

DETAILED DESCRIPTION

Figure 1:
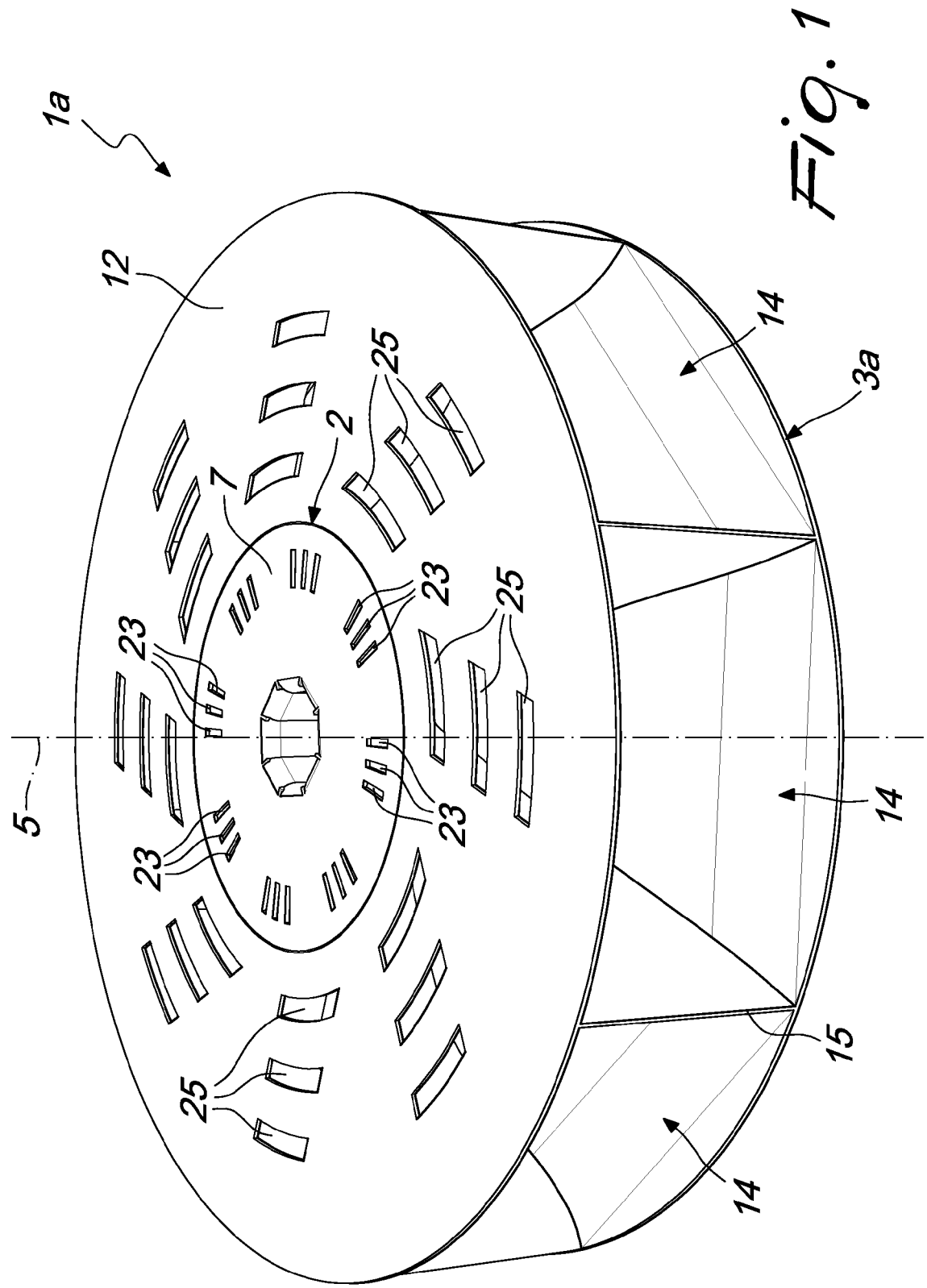
FIG. 1 is a perspective view of a first embodiment of a high-performance turbine, particularly with increased specific power, according to the invention.
Figure 2:
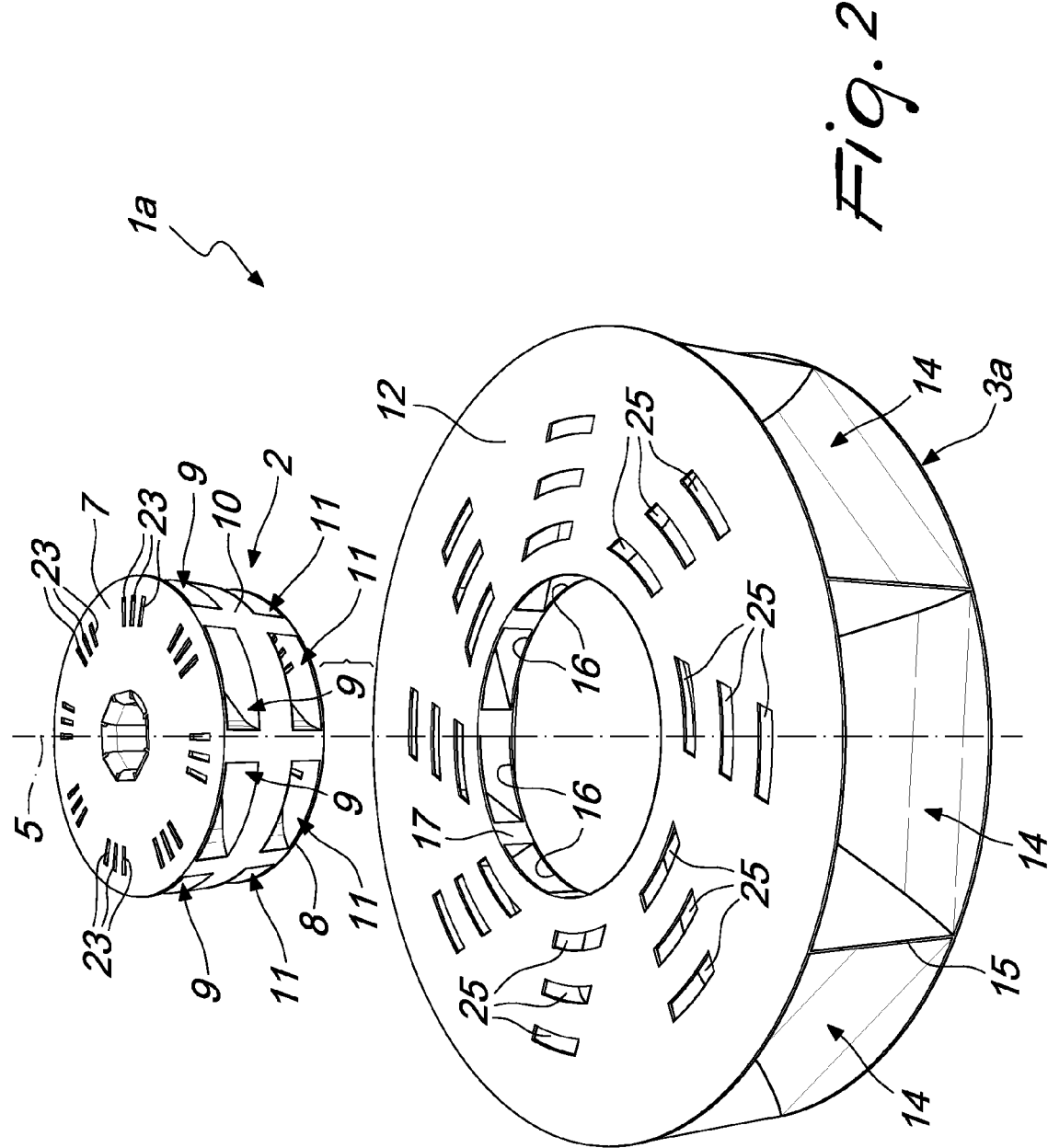
FIG. 2 is an exploded perspective view of the high-performance turbine shown in FIG. 1.
Figure 3:
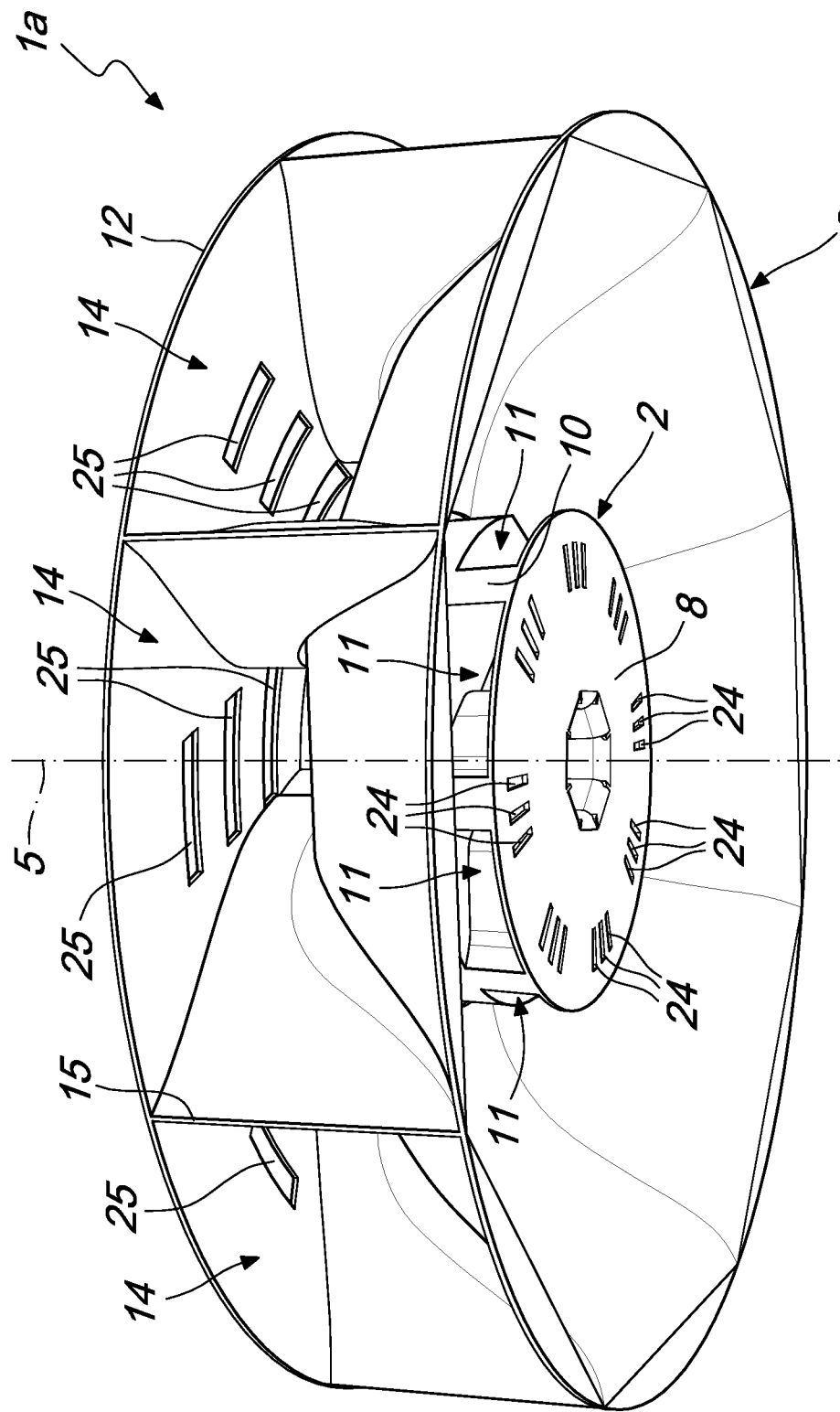
FIG. 3 is a perspective view, taken from below, of the high-performance turbine shown in FIG. 1.
Figure 4:
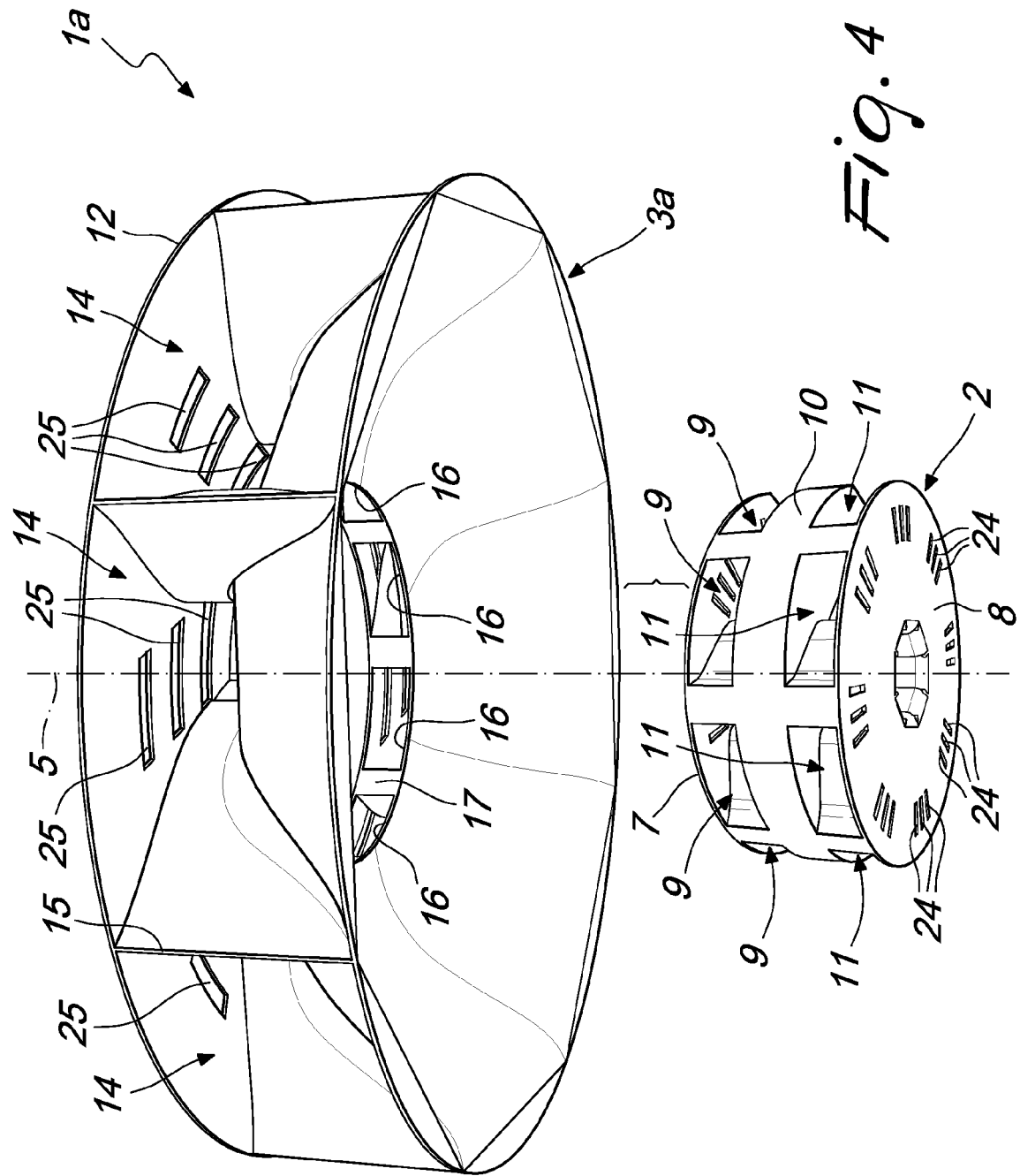
FIG. 4 is an exploded perspective view from below of the high-performance turbine shown in FIG. 1.

With reference to the figures, the high-performance turbine, particularly with increased specific power, designated in the two cited embodiments respectively by the reference numerals 1a and 1b, comprises a rotor 2, which is the same for both embodiments and can be connected, for example, to an alternator or the like so as to convert the kinetic energy of the rotor 2 into electric power or mechanical energy (depending on the conversion system used), and a distribution apparatus, designated by the reference numerals 3a or 3b depending on the embodiment considered, which is adapted to convey a fluid stream 4 onto the elements of the rotor 2 for its rotation about its rotation axis 5.

Advantageously, the rotary thrust required for the rotation of the rotor 2 is provided by means of the presence of a plurality of thrust ducts 6, which are formed directly by the rotor 2 and are adapted to receive the fluid stream 4 conveyed by the distribution apparatus 3a or 3b, which by striking the surrounding walls of the thrust ducts 6 provides indeed the rotary thrust required for the rotation of the rotor 2.

More precisely, the rotor 2 comprises a substantially cylindrical circular body delimited by a first flat portion 7 and a second flat portion 8, which are respectively top and bottom if, for example, the turbine 1a or 1b has a vertical rotation axis 5.

In the proposed embodiments, for the sake of constructive simplicity, the first flat portion 7 and the second flat portion 8 are mutually parallel and both are perpendicular to the rotation axis 5 of the rotor 2.

The thrust ducts 6 are formed between the first flat portion 7 and the second flat portion 8 and are arranged uniformly with respect to each other according to an angular sequence that is defined with respect to the rotation axis 5.

More precisely, each one of the thrust ducts 6 extends from an intake section 9 of the rotor 2 formed on the outer lateral surface 10 of the rotor 2 proximate to the first flat portion 7 to an outlet section 11 of the rotor 2 that is formed on the same outer lateral surface 10 proximate to the second flat portion 8.

With reference to the classification of the turbines that is based on the main direction followed by the fluid flow once it has made contact with the rotor, the turbine 1a or 1b according to the present invention is a turbine of the mixed-flow type, in that the fluid stream 4 enters the thrust ducts 6 in a direction that is substantially tangent to the rotor 2, is diverted first in a substantially radial direction, then in a substantially axial direction, then again in a substantially radial direction, and then exits again substantially tangentially to the rotor 2.

In fact, each one of the thrust ducts 6 comprises, in the direction of travel of the fluid stream 4, a first curvilinear portion, which runs substantially parallel to the first flat portion 7 with a curvature that matches the direction of rotation of the rotor 2, and a second curvilinear portion, which is symmetrical to the first curvilinear portion with respect to a plane of radial symmetry of the rotor 2 which is substantially perpendicular to the rotation axis 5.

Advantageously, the first curvilinear portion and the second curvilinear portion are mutually connected by means of a substantially rectilinear portion that runs substantially parallel to the rotation axis 5 and is formed proximate to the rotation axis 5 so that during its travel through the thrust ducts 6 the fluid stream 4 performs a reversal of travel that is substantially equal to 180°.

More precisely, both the first curvilinear portion and the second curvilinear portion extend respectively from the intake section 9 of the rotor 2 and from the outlet section 11 of the rotor 2 tangentially to the outer lateral surface 10 of the rotor 2, both ending in the rectilinear portion with a direction that is substantially radial with respect to the rotation axis 5.

With particular reference to the first embodiment, the distribution apparatus 3a comprises a body shaped substantially like a hollow cylinder, which is radially external to the rotor 2, forms a plurality of conveyance channels 13 that run substantially radially with respect to the rotation axis 5 of the rotor 2, and has a face 12 that is coplanar to the first flat portion 7.

Conveniently, like the thrust ducts 6 of the rotor 2, the conveyance channels 13 are arranged uniformly with respect to each other according to an angular sequence that is defined with respect to the rotation axis 5.

In this manner, the distribution apparatus 3a is capable of conveying the filling fluid 22 that is present in the outside environment in which the turbine 1a is immersed, regardless of the direction of origin of the flow that strikes the distribution apparatus 3a.

This shape of the distribution apparatus 3a is particularly useful if the fluid stream 4 has a main direction of travel of any kind.

More precisely, each one of the conveyance channels 13 extends along a direction that is inclined with respect to the radial direction concordantly with the direction of rotation of the rotor 2 for the conveyance of the fluid stream 4 into the thrust ducts 6 along a direction that is at least partially tangent to the rotor 2.

In fact, each one of the conveyance channels 13 extends from an intake section 14 of the distribution apparatus 3a that is formed on the outer lateral surface 15 of said distribution apparatus 3a to an outlet section 16 of the distribution apparatus 3a that corresponds to one of the intake sections 9 of the rotor 2 and is formed on the internal lateral surface 17 of the distribution apparatus 3a.

With particular reference to the second embodiment, which as already mentioned differs from the first embodiment only in the distribution apparatus 3b that replaces the distribution apparatus 3a, the distribution apparatus 3b of the turbine 1b comprises a plurality of conveyance ducts 18, which run substantially along a single preferred direction, which is for example radial with respect to the rotation axis 5 of the rotor 2.

In this manner, the distribution apparatus 3b is capable of conveying the fluid stream 4 only if the conveyance ducts 18 of the distribution apparatus 3b have an inlet that matches the direction of origin of the flow that strikes the distribution apparatus 3b.

More precisely, the conveyance ducts 18 extend from intake sections 19 of the distribution apparatus 3b, which are for example mutually coplanar, to a plurality of outlet sections 20 of the distribution apparatus 3b, which correspond to some of the intake sections 9 of the rotor 2, along a direction that is inclined with respect to the radial direction concordantly with the direction of rotation of the rotor 2 for the conveyance of the fluid stream 4 into said thrust ducts 6 along a direction that is at least partially tangent to the rotor 2.

According to the invention, both turbines 1a and 1b, as regards the two described embodiments, comprise at least one slot, which is formed on the walls of the thrust ducts 6 or of the distribution apparatus 3a or 3b and is adapted to connect the fluid stream 4 to the outside environment of the turbine 1a and 1b.

Advantageously, said slot, together with the fact that at least one of the thrust ducts 6 and the distribution apparatus 3a or 3b crossed by the fluid stream 4 comprises at least one portion that converges in the direction of travel of the fluid stream 4 defined upstream of the slot in the direction of travel of the fluid stream 4, allows the suction of the filling fluid 22 from the outside environment into the thrust ducts 6 and/or the distribution apparatus 3a or 3b, which are crossed by the same fluid stream 4.

More precisely, this suction is made possible by the fact that the presence of a converging passage in the path of the fluid stream 4 entails, according to Bernoulli's theorem in the subsonic regime, the at least local lowering of the pressure inside the thrust ducts 6 and/or the distribution apparatus 3a or 3b, which are crossed by the fluid stream 4, below the value of the pressure of the filling fluid 22.

In view of what has been shown, advantageously the rotor 2 has, for each one of the thrust ducts 6, a first plurality of slots 23 formed in the first flat portion 7 at the first curvilinear portion of the thrust duct 6 and, in particular, downstream or proximate to a part of said thrust duct 6 that converges in the direction of travel of said fluid stream 4.

Likewise, the rotor 2 has, for each one of the thrust ducts 6, a second plurality of slots 24 formed in the second flat portion 8 at the second curvilinear portion of the thrust duct 6 and, in particular, upstream or proximate to a part of said thrust duct 6 that diverges along the direction of travel of said fluid stream 4.

More precisely, both slots 23 and 24 are oriented substantially along a radial direction with respect to the rotation axis 5 of the rotor 2. In this manner, the filling fluid 22 drawn into the thrust ducts 6 enters more easily through the slots 23 and 24 of the rotor 2 that is rotating about the rotation axis 5.

Likewise, like the rotor 2, the distribution apparatus 3a or 3b also has, for each one of the conveyance channels 13 or of the conveyance ducts 18 and at their converging part, respectively a third plurality of slots 25 or a fourth plurality of slots 26, which are oriented substantially tangentially to the rotation axis 5 of the rotor 2 and are formed in the walls of the distribution apparatus 3a or 3b downstream or proximate to a converging part of the conveyance channels 13 or of the conveyance ducts 18 in the direction in which the fluid stream 4 travels.

For adjusting the flow-rate of the filling fluid 22 in the thrust ducts 6 and in the conveyance channels 13 or in the conveyance ducts 18, there are means for flow-rate adjustment which are functionally associated with the slots 23, 24 and 25 or 26.

These adjustment means, which are not illustrated for the sake of simplicity, can comprise for example of gates which are applied to the slots 23, 24 and 25 or 26 and can be actuated, for example, by an automatic control system.

The operation of the two embodiments 1a and 1b of the high-performance turbine, particularly with increased specific power, according to the present invention is as follows.

Regardless of the type of distribution apparatus 3a or 3b, the fluid stream 4 that strikes said distribution apparatus 3a or 3b is channeled into the conveyance channels 13 or into the conveyance ducts 18, through which, due to their cross-section which converges in the direction in which the fluid stream 4 travels, the average velocity of said fluid stream 4 increases.

By operating in a subsonic velocity regime, according to Bernoulli's theorem, a pressure drop occurs along the flow lines of the fluid stream 4 with respect to the pressure of the filling fluid 22 of the outside environment in which the turbine 1a or 1b is immersed.

As a consequence of this pressure drop, a flow of fluid 22 is drawn from the outside environment through the slots 25 or 26, increasing the flow rate of the fluid stream 4, as well as the average velocity thereof and consequently lowering further the pressure of the fluid stream 4.

One has, therefore, an overall situation in which the fluid flow rates that exit from the outlet sections 16 of the conveyance channels 13 of the distribution apparatus 3a, or from the outlet sections 20 of the conveyance ducts 18 of the distribution apparatus 3b, are higher than the flow-rates that enter from the intake sections 14 of the conveyance channels 13 of the distribution apparatus 3a, or from the intake sections 19 of the conveyance ducts 17 of the distribution apparatus 3b.

Moreover, the velocities of the fluid stream 4 that exits from the outlet sections 16 or from the outlet sections 20 also are higher than the average velocities of the fluid stream 4 that enters from the intake sections 14 or from the intake sections 19.

In output from the conveyance channels 13 or from the conveyance ducts 18, through the outlet sections 16 or 20 of the distribution apparatus, respectively 3a or 3b, the fluid stream 4 enters the thrust ducts 6 of the rotor 2.

On the basis of what has been described, the fluid stream 4 enters the thrust ducts 6 of the rotor 2, making it rotate about the rotation axis 5, at a pressure that is lower than the pressure of the filling fluid 22 of the outside environment.

The presence of the slots 23 and 24 in the two flat portions 7 and 8 of the thrust ducts 6 causes the filling fluid 22 to be drawn from the outside toward the inside of the thrust ducts 6 in quantities per unit time, i.e., flow-rates, that depend on the number, dimensions and position of the set of slots 23 and 24 that are actually present.

The presence of these slots 23 and 24 in any case allows the inflow of given quantities of filling fluid 22 into the thrust ducts 6 and thus an increase in the fluid flow rates that travel inside the thrust ducts 6 with respect to the quantities that have entered from the intake sections 9 of said thrust ducts 6 and arrive from the conveyance channels 13 of the distribution apparatus 3a or from the conveyance ducts 18 of the distribution apparatus 3b.

Furthermore, with each increase in flow-rate that occurs at each one of the slots 23 and/or 24, directly downstream of each one of these slots, an increase in the average velocity of the flow occurs as well as a further reduction in local pressure.

One has, therefore, an overall situation in which the fluid flow rates that exit from the outlet sections 11 of the thrust ducts 6 are greater than the flow rates that enter from the intake sections 9 of said thrust ducts 6 and moreover the average velocity of the fluid stream 4 that exits from the outlet sections 11 is greater than the average velocity of the fluid stream 4 that enters from the intake sections 9.

Since the rotary thrust discharged by the fluid stream 4 onto the walls of the thrust ducts 6 is proportional to the flow-rates that enter from the intake sections 9 and to the ones that exit from the outlet sections 11, and since said rotary thrust is also proportional to the values of average velocity of the flow that enters from the intake sections 9 and to those of the flow that exits from the outlet sections 11, it is clear that an increase in these two quantities, flow-rate and average velocity, along the path that runs from the intake sections 9 to the outlet sections 11, increases considerably the rotary thrust discharged by the fluid stream 4 onto the walls of the thrust ducts 6, and thus increases considerably the specific power that can be delivered by the turbine 1a or 1b.

This specific power that can be delivered by the turbine 1a or 1b is thus increased with respect to the specific power levels that can be delivered by turbines of the known type, not only because of what occurs in the thrust ducts 6 but also because of what occurs in the conveyance channels 13 or in the conveyance ducts 18.

For better understanding of the operation of the high-performance turbine, particularly with increased specific power, a numeric example is provided hereafter which is related to the operation of the first embodiment 1a.

In terms of methodology, an analysis of the integral type is performed by referring to the control volumes that are pertinent to each step of the analysis.

More precisely, reference shall be made to the configuration of a single conveyance channel 13 and a single thrust duct 6.

Figure 5:
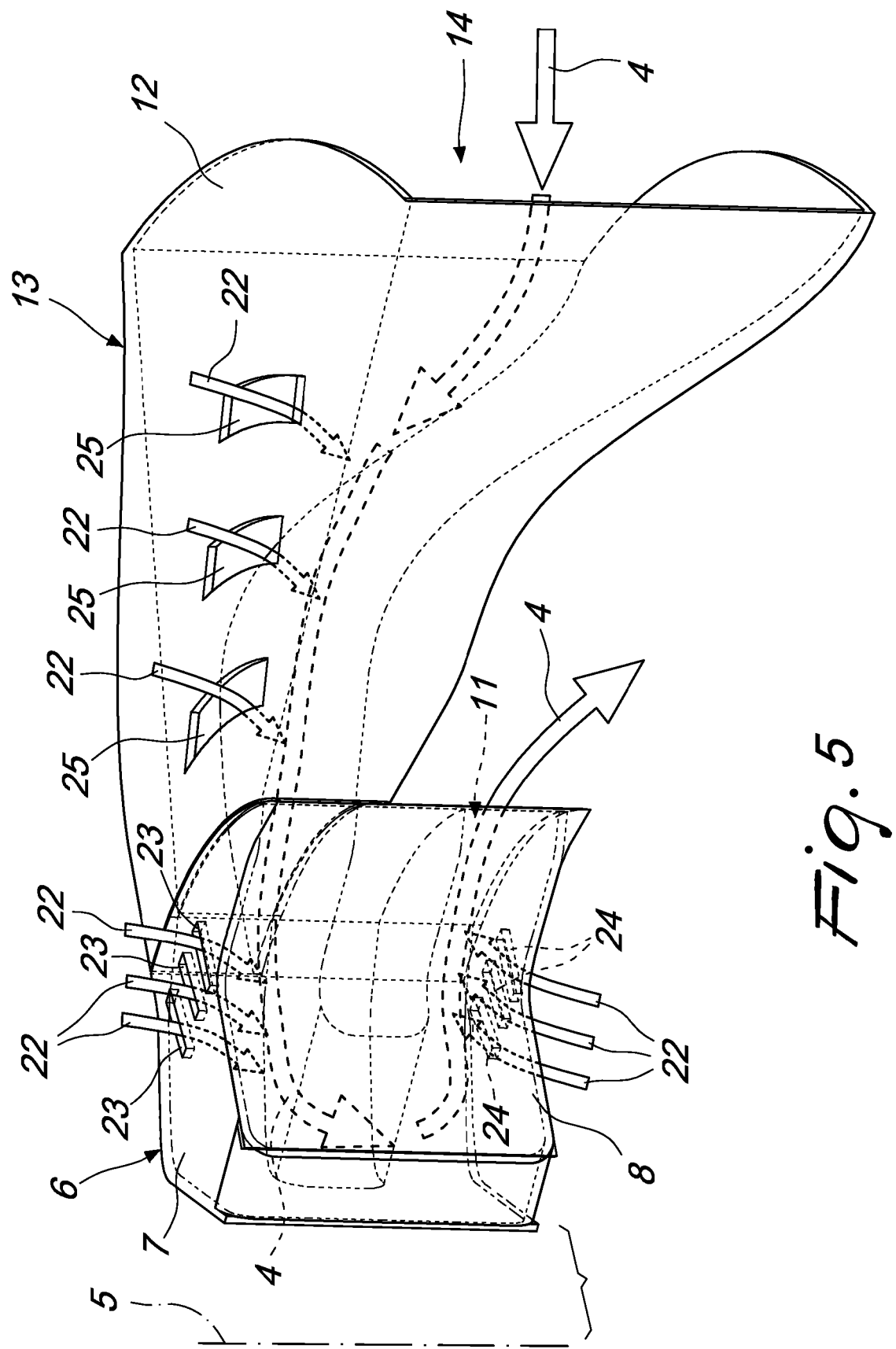
FIG. 5 is a perspective view of a portion of the high-performance turbine shown in FIG. 1.
Figure 6:
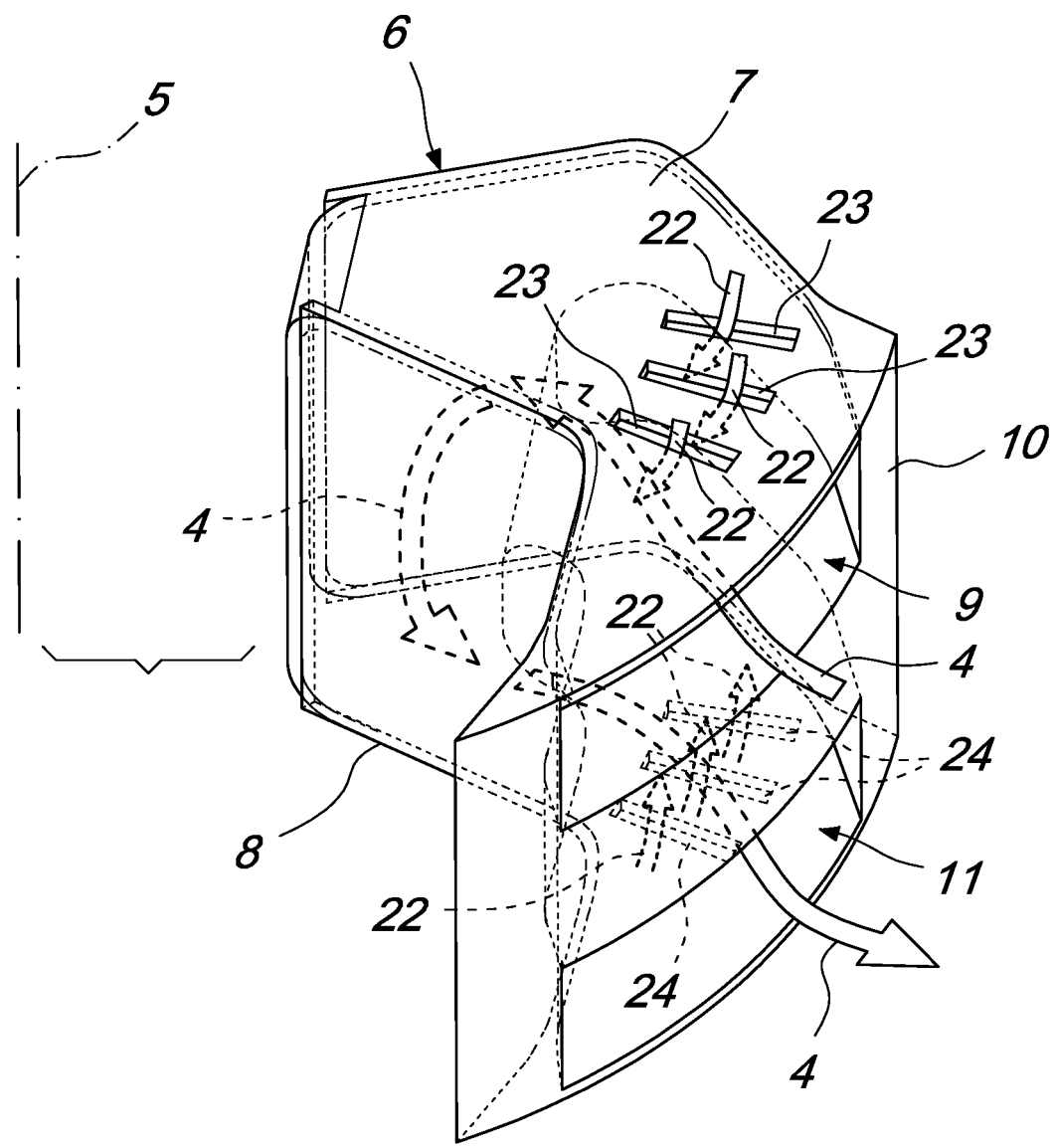
FIG. 6 is a perspective view of a portion of the rotor of the high-performance turbine shown in FIG. 1.
Figure 7:
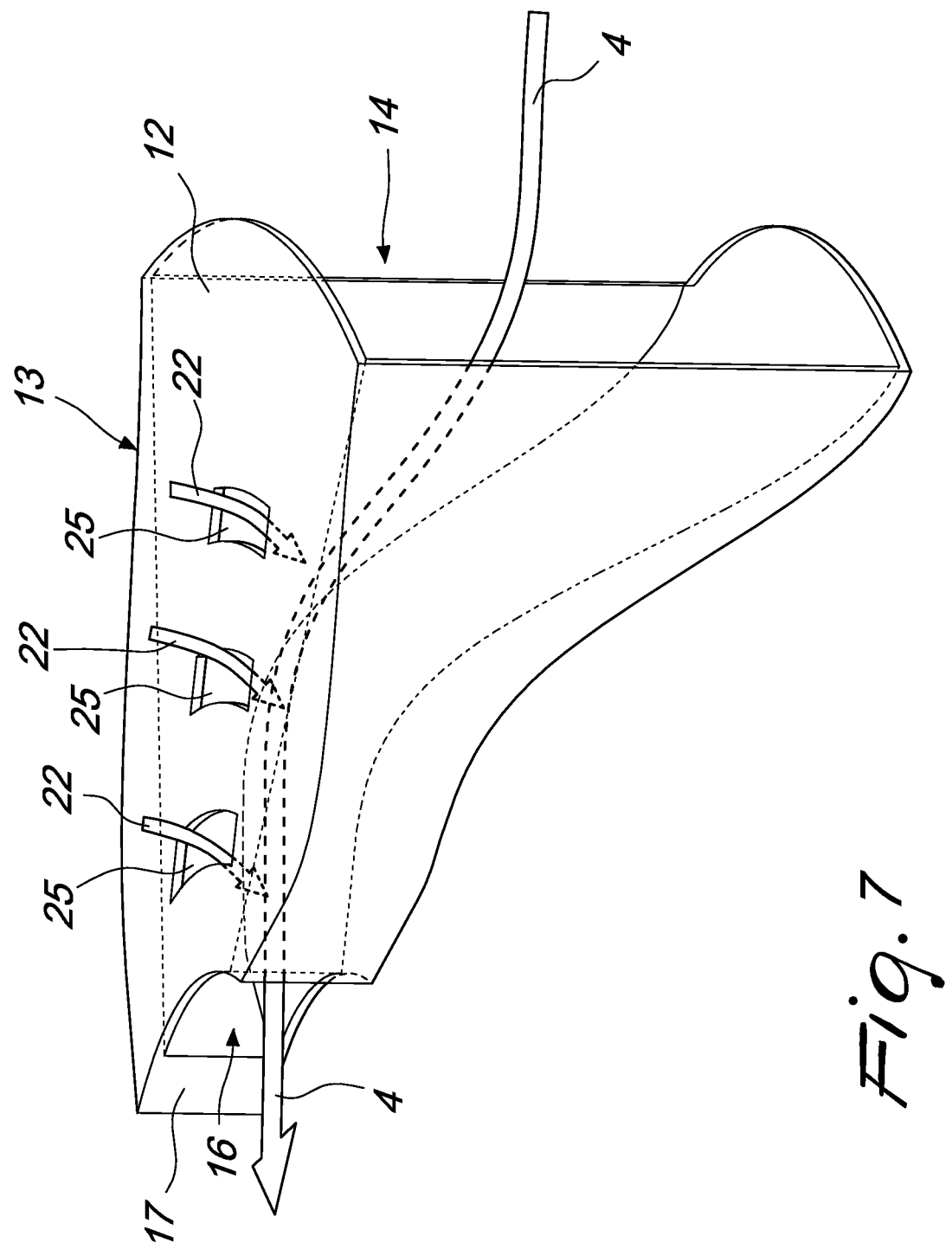
FIG. 7 is a perspective view of a portion of the conveyance apparatus of the high-performance turbine shown in FIG. 1.
Figure 8:
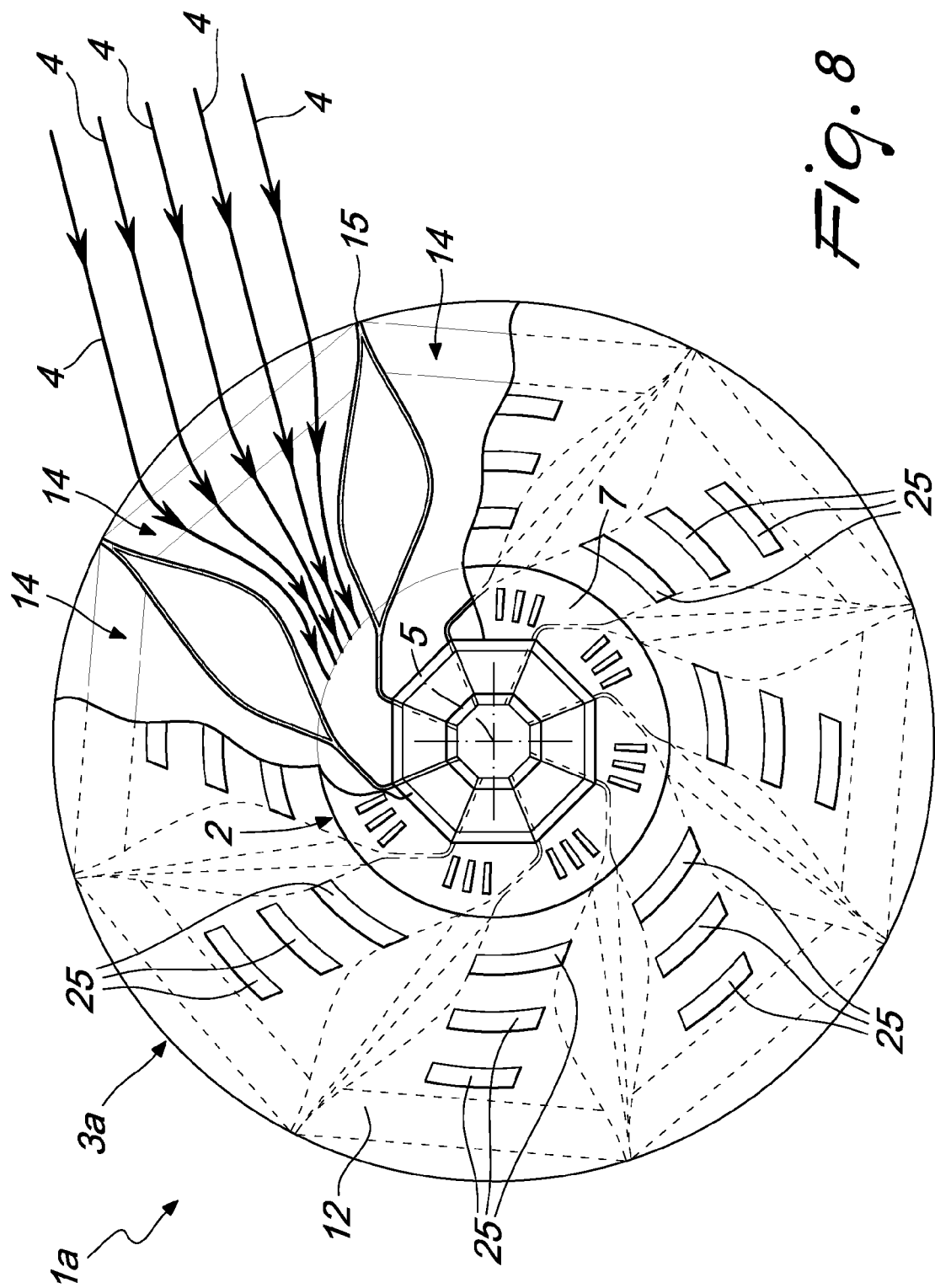
FIG. 8 is a partially cutout plan view of the high-performance turbine shown in FIG. 1.
Figure 9:
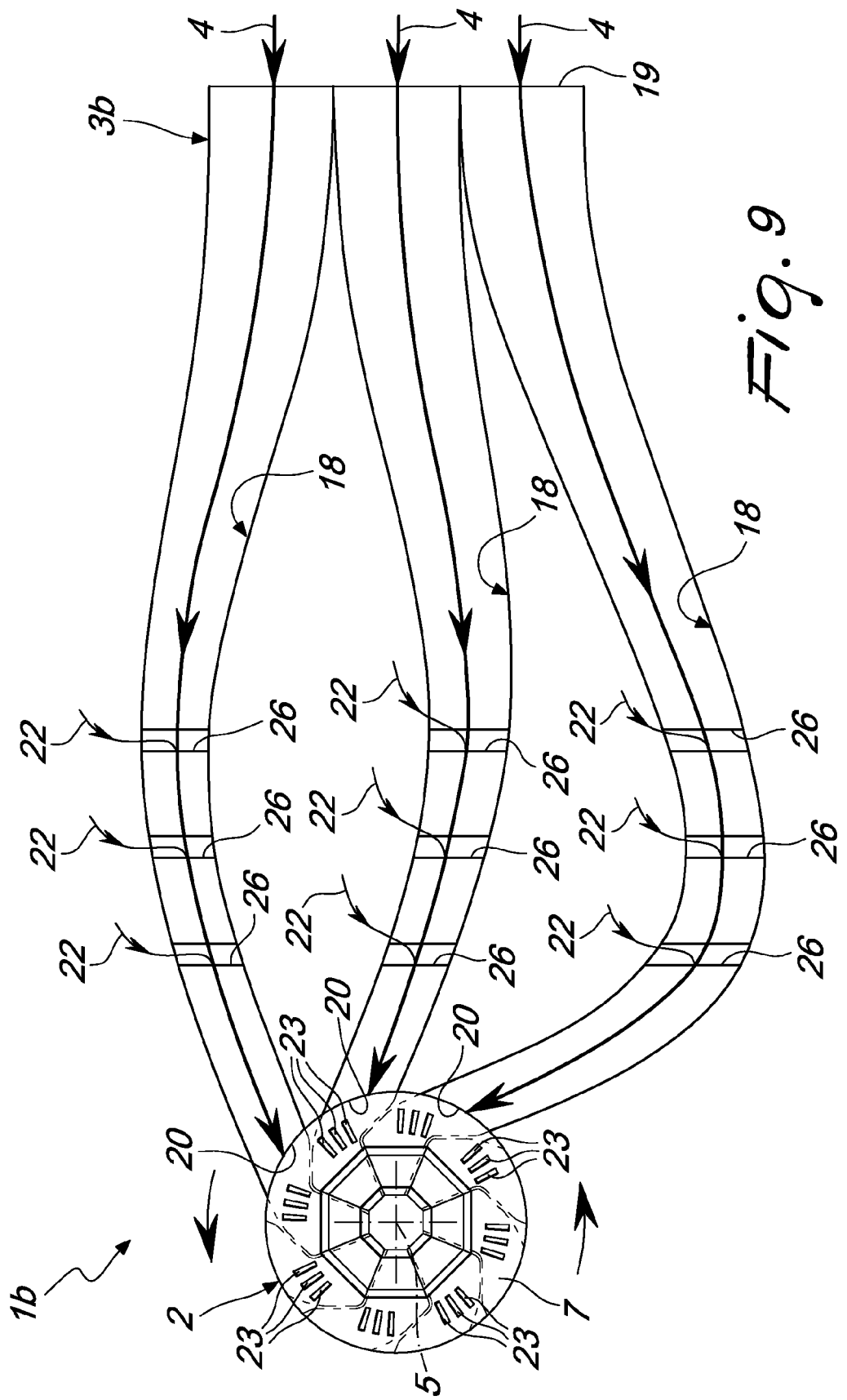
FIG. 9 is a plan view of a second embodiment of a high-performance turbine, particularly with increased specific power, according to the invention.

With particular reference to FIGS. 5, 6, 7 and 8, if the slots 23, 24 and 25 of the conveyance channel 13 of the distribution apparatus 3a and of the thrust duct 6 of the rotor 2 are to be considered closed, consider a flow of incompressible fluid, which is assumed to be non-viscous, undisturbed in a steady state, which moves with an undisturbed average velocity "$V_0$" and strikes the turbine 1a along a direction that is substantially radial to it.

At the intake section 14 of the conveyance channel 13, which indicates the intake section of the control volume that coincides with said conveyance channel 13, the following applies:

$$V_A \cong V_0;\ Q_A = V_A A_A;\ M_A = \rho Q_A V_A;\ P_A^{cin} = \tfrac{1}{2}\rho Q_A V_A^2 \qquad (1.1)$$

which are the expressions respectively of the average velocity, of the flow-rate, of the momentum flow and of the kinetic power of the fluid stream 4 at the intake section 14 of the conveyance channel 13 and where:

"$V_0$" is the average velocity of the undisturbed flow at the inlet of the conveyance channel 13;

"$V_A$" is the average velocity of the fluid stream 4 at the intake section 14 of the conveyance channel 13;

"$A_A$" is the projection of the intake section 14 of the conveyance channel 13, in a direction at right angles to the flow, and is equal, for example, to 0.12 m² ($A_A = 0.30$ m×0.40 m=0.12 m²);

"$Q_A$" is the volumetric flow rate of the fluid stream 4 at the intake section 14 of the conveyance channel 13;

"$\rho$" is the density of the fluid of the fluid stream 4, and for this numerical example air at ambient temperature and atmospheric pressure is considered, and therefore is equal to 1.2 kg/m³;

"$M_A$" is the momentum flow of the fluid stream 4 at the intake section 14 of the conveyance channel 13;

"$P_A^{cin}$" is the kinetic power of the fluid stream 4 at the intake section 14 of the conveyance channel 13.

Table 1.1 reports the numerical values of the quantities expressed in (1.1) that correspond to a series of values of average velocity "$V_0$" of the undisturbed flow that strikes the turbine 1a.

TABLE 1.1

Conveyance channel 13 with slots 25 closed.

| $V_0$ [km/h] | $\rho$ [kg/m³] | $V_0$ [m/s] | $V_A$ [m/s] | $A_A$ [m²] | $Q_A$ [m³/s] | $M_A$ [N] | $P_A^{cin}$ [W] | $P_A^{cin}$ [kW] |
|---|---|---|---|---|---|---|---|---|
| 10 | 1.2 | 2.78 | 2.78 | 0.12 | 0.33 | 1.10 | 1.53 | 0.0015 |
| 20 | 1.2 | 5.56 | 5.56 | 0.12 | 0.67 | 4.47 | 12.43 | 0.012 |
| 30 | 1.2 | 8.33 | 8.33 | 0.12 | 1.00 | 10.00 | 41.65 | 0.042 |
| 40 | 1.2 | 11.11 | 11.11 | 0.12 | 1.33 | 17.73 | 98.49 | 0.098 |
| 50 | 1.2 | 13.89 | 13.89 | 0.12 | 1.67 | 27.84 | 193.35 | 0.193 |
| 60 | 1.2 | 16.67 | 16.67 | 0.12 | 2.00 | 40.01 | 333.48 | 0.333 |
| 70 | 1.2 | 19.44 | 19.44 | 0.12 | 2.33 | 54.35 | 528.28 | 0.528 |
| 80 | 1.2 | 22.22 | 22.22 | 0.12 | 2.67 | 71.19 | 790.92 | 0.791 |
| 90 | 1.2 | 25.00 | 25.00 | 0.12 | 3.00 | 90.00 | 1125.00 | 1.125 |
| 100 | 1.2 | 27.78 | 27.78 | 0.12 | 3.33 | 111.01 | 1541.93 | 1.542 |

Values assumed by the quantities expressed in (1.1) at the intake section 14 of the conveyance channel 13.

At the outlet section 16 of the conveyance channel 13, which indicates the section at the end of the control volume that coincides with said conveyance channel 13, the following apply:

$$Q_B = Q_A;\ V_B = Q_B/A_B;\ M_B = \rho Q_B V_B;\ P_B^{cin} = \tfrac{1}{2}\rho Q_B V_B^2 \qquad (1.2)$$

where:

"$V_B$" is the average velocity of the fluid stream 4 at the outlet section 16 of the conveyance channel 13;

"$A_B$" is the projection of the outlet section 16 of the conveyance channel 13, in a direction at right angles to the flow, and is equal, for example, to 0.06 m² ($A_B$=0.20 m×0.30 m=0.06 m²);

"$Q_B$" is the volumetric flow-rate of the fluid stream 4 at the outlet section 16 of the conveyance channel 13 and is equal to "$Q_A$";

"$M_B$" is the momentum flow of the fluid stream 4 at the outlet section 16 of the conveyance channel 13;

"$P_B^{cin}$" is the kinetic power of the fluid stream 4 at the outlet section 16 of the conveyance channel 13.

Table 1.2 reports the numerical values of the quantities expressed in (1.2) that correspond to a series of values of average velocity "$V_0$" of the undisturbed flow that strikes the turbine 1a.

From the data reported in Tables 1.1 and 1.2 it is possible to note that the kinetic power of the fluid stream 4 at the outlet section 16 of the conveyance channel 13 is increased with respect to the one at the intake section 14 of said conveyance channel 13.

This is due to the increase in velocity that occurs in passing from the intake section 14 to the outlet section 16, due to the narrowing of the outlet section 16 with respect to the intake section 14.

Correspondingly, in accordance with Bernoulli's theorem, the pressure of the fluid stream 4 at the outlet section 16 is lower than the one at the intake section 14.

TABLE 1.2

Conveyance channel 13 with slots 25 closed.

| $V_0$ [km/h] | ρ [kg/m³] | $V_0$ [m/s] | $V_B$ [m/s] | $A_B$ [m²] | $Q_A = Q_B$ [m³/s] | $M_B$ [N] | $P_B^{cin}$ [W] | $P_B^{cin}$ [kW] |
|---|---|---|---|---|---|---|---|---|
| 10 | 1.2 | 2.78 | 5.50 | 0.06 | 0.33 | 2.18 | 6.00 | 0.006 |
| 20 | 1.2 | 5.56 | 11.17 | 0.06 | 0.67 | 8.98 | 50.15 | 0.050 |
| 30 | 1.2 | 8.33 | 16.67 | 0.06 | 1.00 | 20.00 | 166.70 | 0.167 |
| 40 | 1.2 | 11.11 | 22.17 | 0.06 | 1.33 | 35.38 | 392.19 | 0.392 |
| 50 | 1.2 | 13.89 | 27.83 | 0.06 | 1.67 | 55.77 | 776.04 | 0.776 |
| 60 | 1.2 | 16.67 | 33.33 | 0.06 | 2.00 | 79.99 | 1333.03 | 1.333 |
| 70 | 1.2 | 19.44 | 38.83 | 0.06 | 2.33 | 108.57 | 2107.89 | 2.108 |
| 80 | 1.2 | 22.22 | 44.50 | 0.06 | 2.67 | 142.58 | 3172.41 | 3.172 |
| 90 | 1.2 | 25.00 | 50.00 | 0.06 | 3.00 | 180.00 | 4500.00 | 4.500 |
| 100 | 1.2 | 27.78 | 55.50 | 0.06 | 3.33 | 221.78 | 6154.40 | 6.154 |

Values assumed by the quantities expressed in (1.2) at the outlet section 16 of the conveyance channel 13.

Once the fluid stream has crossed the conveyance channel 13, it begins its path in the thrust duct 6 of the rotor 2.

For better comprehension of the quantity of kinetic energy that the fluid stream 4 has at the inlet of the thrust duct 6, it is assumed here that the rotor 2 is fixed to the distribution apparatus 3a, i.e., cannot rotate with respect to it.

In fact, this hypothesis allows an assessment of the values of some quantities related to the fixed thrust duct 6, which will then be compared with the case of the thrust duct 6 that is free to rotate.

At the intake section 9 of the thrust duct 6, which indicates the intake section of the control volume that coincides with said thrust duct 6, the following apply:

$$Q_C=Q_B; V_C=V_B; Q_C=V_C A_C; M_C=\rho Q_C V_C;$$
$$P_C^{cin}=\tfrac{1}{2}\rho Q_C V_C^2 \qquad (1.3)$$

where:

"$V_C$" is the average velocity of the fluid stream 4 at the intake section 9 of the thrust duct 6 (which is equal to "$V_B$");

"$A_C$" is the projection of the intake section 9 of the thrust duct 6, in a direction at right angles to the flow, and is equal to "$A_B$";

"$Q_C$" is the volumetric flow-rate of the fluid stream 4 at the intake section 9 of the thrust duct 6 and is equal to "$Q_B$";

"$M_C$" is the momentum flow of the fluid stream 4 at the intake section 9 of the thrust duct 6;

"$P_C^{cin}$" is the kinetic power of the fluid stream 4 at the intake section 9 of the thrust duct 6.

At the outlet section 11 of the thrust duct 6, which indicates the outlet section of the control volume that coincides with said thrust duct 6, "$A_D=A_C$" and thus the values of the quantities involved remain unchanged with respect to the intake section 9 of the thrust duct 6.

In fact:

$$Q_D=Q_C; V_D=V_C; Q_D=V_D A_D; M_D=\rho Q_D V_D;$$
$$P_D^{cin}=\tfrac{1}{2}\rho Q_D V_D^2 \qquad (1.4)$$

where:

"$V_D$" is the average velocity of the fluid stream 4 at the outlet section 11 of the thrust duct 6 and is equal to "$V_C$";

"$A_D$" is the projection of the intake section 9 of the outlet duct 11, in a direction at right angles to the flow, and is equal to "$A_C$";

"$Q_D$" is the volumetric flow-rate of the fluid stream 4 at the outlet section 11 of the thrust duct 6 and is equal to "$Q_C$";

"$M_D$" is the momentum flow of the fluid stream 4 at the outlet section 11 of the thrust duct 6 and is equal to "$M_C$";

"$P_D^{cin}$" is the kinetic power of the fluid stream 4 at the outlet section 11 of the thrust duct 6 (which is equal to "$P_C^{cin}$").

Table 1.3 reports the numerical values of the quantities expressed in (1.3) and in (1.4) that correspond to a series of values of average velocity "$V_0$" of the undisturbed flow that strikes the turbine 1a.

It is now possible to calculate the thrust applied by the fluid stream 4 that exits from the conveyance channel 13 to the walls of the thrust duct 6 of the rotor 2 with the assumption that the latter cannot rotate with respect to the distribution apparatus 3a.

For this purpose, the momentum equation is applied to a control volume that coincides with said thrust duct 6. This equation, projected along the direction that is tangential to the rotor 2, gives:

$$S=M_C-M_D \cos\theta=\rho Q_C V_C-\rho Q_D V_D \cos\theta=2\rho Q_C V_C \qquad (1.5)$$

where:

"S" is the thrust discharged onto the walls of the thrust duct 6 of the rotor 2;

"θ" is the angle by which the flow is diverted in the thrust ducts 6 and is equal to 180° C.

TABLE 1.3

Thrust duct 6 with slots 23 and 24 closed.

| $V_0$ [km/h] | ρ [kg/m³] | $V_0$ [m/s] | $V_D = V_C$ [m/s] | $A_D = A_C$ [m²] | $Q_D = Q_C$ [m³/s] | $M_D = M_C$ [N] | $P_D^{cin} = P_C^{cin}$ [W] | $P_D^{cin} = P_C^{cin}$ [kW] |
|---|---|---|---|---|---|---|---|---|
| 10 | 1.2 | 2.78 | 5.50 | 0.06 | 0.33 | 2.18 | 6.00 | 0.006 |
| 20 | 1.2 | 5.56 | 11.17 | 0.06 | 0.67 | 8.98 | 50.15 | 0.050 |
| 30 | 1.2 | 8.33 | 16.67 | 0.06 | 1.00 | 20.00 | 166.70 | 0.167 |
| 40 | 1.2 | 11.11 | 22.17 | 0.06 | 1.33 | 35.38 | 392.19 | 0.392 |
| 50 | 1.2 | 13.89 | 27.83 | 0.06 | 1.67 | 55.77 | 776.04 | 0.776 |
| 60 | 1.2 | 16.67 | 33.33 | 0.06 | 2.00 | 79.99 | 1333.03 | 1.333 |
| 70 | 1.2 | 19.44 | 38.83 | 0.06 | 2.33 | 108.57 | 2107.89 | 2.108 |

TABLE 1.3-continued

Thrust duct 6 with slots 23 and 24 closed.

| $V_0$ [km/h] | $\rho$ [kg/m³] | $V_0$ [m/s] | $V_D = V_C$ [m/s] | $A_D = A_C$ [m²] | $Q_D = Q_C$ [m³/s] | $M_D = M_C$ [N] | $P_D^{cin} = P_C^{cin}$ [W] | $P_D^{cin} = P_C^{cin}$ [kW] |
|---|---|---|---|---|---|---|---|---|
| 80 | 1.2 | 22.22 | 44.50 | 0.06 | 2.67 | 142.58 | 3172.41 | 3.172 |
| 90 | 1.2 | 25.00 | 50.00 | 0.06 | 3.00 | 180.00 | 4500.00 | 4.500 |
| 100 | 1.2 | 27.78 | 55.50 | 0.06 | 3.33 | 221.78 | 6154.40 | 6.154 |

Values assumed by the quantities expressed in (1.3) and in (1.4), respectively, at the intake section 9 and at the outlet section 11 of thrust duct 6.

Thus a value of the thrust is achieved which is equal to twice the momentum flow that enters the thrust ducts, due to the redirection through 180° of the flow between the intake section 9 and the outlet section 11 of the thrust ducts 6.

The corresponding momentum to a possible shaft inserted so as to be jointly connected in the hub of the rotor 2, again assuming that the latter cannot rotate with respect to the distribution apparatus 3a, is given by:

$$T_{al} = SR \quad (1.6)$$

where:
"$T_{al}$" is the momentum applied to a possible shaft inserted so as to be jointly connected in the hub of the rotor 2;
"R" is the arm of the rotary thrust, i.e., the distance between the rotation axis 5 of the rotor 2 and the point of application of the rotary thrust, i.e., "S". In subsequent calculations it will be considered equal to an exemplary value of 0.6 m.

Table 1.4 reports the numerical values of the quantities expressed in (1.5) and in (1.6), which correspond to a series of values of average velocity "$V_0$" of the undisturbed flow that strikes the turbine 1a.

It should be noted that for the purposes of the present assessments, the load losses caused by the friction on the surrounding walls, both of the conveyance channel 13 of the distribution apparatus 3a and of the thrust duct 6 of the rotor 2, have not been taken into consideration due to the previous assumption of a non-viscous fluid.

This simplifying assumption yields the theoretical result that the kinetic powers of the fluid stream 4 at the intake and at the outlet of the thrust duct 6 are equal. Physically, this is not exactly true, but these aspects are not significantly relevant for the present numerical example.

TABLE 1.4

Thrust duct 6 with slots 23 and 24 closed.

| $V_0$ [km/h] | $\rho$ [kg/m³] | $V_0$ [m/s] | $V_C = V_D$ [m/s] | R [m] | $Q_C = Q_D$ [m³/s] | $M_C = M_D$ [N] | S [N] | $T_{al}$ [N*m] |
|---|---|---|---|---|---|---|---|---|
| 10 | 1.2 | 2.78 | 5.50 | 0.60 | 0.33 | 2.18 | 4.36 | 2.62 |
| 20 | 1.2 | 5.56 | 11.17 | 0.60 | 0.67 | 8.98 | 17.96 | 10.78 |
| 30 | 1.2 | 8.33 | 16.67 | 0.60 | 1.00 | 20.00 | 40.00 | 24.00 |
| 40 | 1.2 | 11.11 | 22.17 | 0.60 | 1.33 | 35.38 | 70.76 | 42.46 |
| 50 | 1.2 | 13.89 | 27.83 | 0.60 | 1.67 | 55.77 | 111.54 | 66.92 |
| 60 | 1.2 | 16.67 | 33.33 | 0.60 | 2.00 | 79.99 | 159.98 | 95.99 |
| 70 | 1.2 | 19.44 | 38.83 | 0.60 | 2.33 | 108.57 | 217.14 | 130.28 |
| 80 | 1.2 | 22.22 | 44.50 | 0.60 | 2.67 | 142.58 | 285.16 | 171.10 |
| 90 | 1.2 | 25.00 | 50.00 | 0.60 | 3.00 | 180.00 | 360.00 | 216.00 |
| 100 | 1.2 | 27.78 | 55.50 | 0.60 | 3.33 | 221.78 | 443.56 | 266.14 |

Values assumed by the quantities expressed in (1.5) and in (1.6).

Differently from what has been described so far, it is now assumed that the fluid stream, in exiting from the outlet section 16 of the conveyance channel 13 of the distribution apparatus 3a, enters the thrust ducts 6 of the rotor 2 so that said rotor is free to rotate about its own rotation axis 5 with an angular and tangential velocity according to the following expressions:

$$U = \omega R; \quad \omega = 2\pi n/60 \quad (1.7)$$

where:
"U" is the tangential velocity of the rotor 2;
"$\omega$" is the angular velocity of the rotor 2;
"n" is the rotation rate, expressed in revolutions per minute, of the rotor 2.

At the intake section 9 of the thrust duct 6 of the rotor 2 the following apply:

$$V_C^R = V_C - U; \quad M_C = \rho Q_C V_C^R = \rho Q_C (V_C - U) \quad (1.8)$$

where:
"$V_C^R$" is the average velocity of the fluid stream 4 at the intake section 9 of the thrust duct 6 in relation to the rotor 2.

At the outlet section 11 of the thrust duct 6 of the rotor 2 the following apply:

$$V_D^R = V_D - U; \quad M_D = \rho Q_D V_D^R = \rho Q_D (V_D - U) \quad (1.9)$$

"$V_A^R$" is the average velocity of the fluid stream 4 at the outlet section 11 of the thrust duct 6 in relation to the rotor 2.

The rotary thrust discharged by the fluid stream 4 onto the walls of the thrust duct 6 of the rotor that is free to rotate is thus equal to:

$$S = M_C - M_D \cos\theta = \rho Q_C V_C^R - \rho Q_D V_D^R \cos\theta = 2\rho Q_C V_C^R = 2\rho Q_C (V_C - U) \quad (1.10)$$

Thus again a value of the rotary thrust is obtained that is equal to twice the momentum flow that enters the thrust duct 6 of the rotor 2, which is free to rotate, due to the redirection through 180° of the fluid stream 4 between the intake and the outlet of the thrust duct 6.

In view of what has been described, the momentum at a possible shaft inserted so as to be jointly connected in the hub of the rotor 2 and the theoretical power that can be obtained thereat are equal to:

$$T_{al} = SR = 2\rho R Q_C (V_C - U) \quad (1.11)$$

$$P_{teor} = SU = T_{al} \omega = 2\rho U Q_C (V_C - U) \quad (1.12)$$

whose maximum values are obtained when $U = V_C/2$.

The effective power that can be obtained at the shaft differs from expression (1.12) for the efficiency "$\eta$", therefore:

$$P_{eff} = \eta P_{teor} \quad (1.13)$$

A realistic value to be assumed for the efficiency can be, by way of indication, "$\eta = 0.85$".

Table 1.5 reports the numerical values of the quantities expressed in (1.12) and in (1.13) that correspond to a series of values of average velocity "$V_0$" of the undisturbed flow that strikes the turbine 1a.

By a comparison of the values reported in Table 1.5 and those reported in Table 1.3, it can be noted that the values of the theoretical powers that can be obtained at the shaft of the rotor 2 are equal to those of the kinetic powers of the flow that enters the thrust duct 6.

This result has been obtained by assuming "$U = V_C/2$", i.e., the relation between "$V_C$" and "U" that maximizes "$P_{teor}$" for the rotor 2.

However, and as described earlier, the effective power levels available at the shaft of the rotor differ from the theoretical ones in the value of overall efficiency.

As mentioned earlier, the expression of the power of the flow that arrives at the intake section 14 of the conveyance channel 13 given in (1.1) represents the purely kinetic part of said power, i.e., the part of the total power of the fluid stream 4 that can be used for energy exchange between the fluid and the machine

TABLE 1.5

Thrust duct 6 with slots 23 and 24 closed.

| $V_0$ [km/h] | $V_0$ [m/s] | $U = (V_C/2)$ [m/s] | $M_C = M_D$ [N] | S [N] | $T_{al}$ [N * m] | $P_{teor}$ [W] | $P_{teor}$ [kW] | $P_{eff}$ [kW] |
|---|---|---|---|---|---|---|---|---|
| 10 | 2.78 | 2.75 | 1.09 | 2.18 | 1.31 | 6.00 | 0.006 | 0.005 |
| 20 | 5.56 | 5.59 | 4.49 | 8.98 | 5.39 | 50.20 | 0.050 | 0.042 |
| 30 | 8.33 | 8.34 | 10.01 | 20.02 | 12.01 | 168.47 | 0.168 | 0.143 |
| 40 | 11.11 | 11.09 | 17.70 | 35.40 | 21.24 | 421.26 | 0.421 | 0.358 |
| 50 | 13.89 | 13.92 | 27.90 | 55.80 | 33.48 | 776.74 | 0.777 | 0.661 |
| 60 | 16.67 | 16.67 | 40.01 | 80.02 | 48.01 | 1333.93 | 1.334 | 1.134 |
| 70 | 19.44 | 19.42 | 54.30 | 108.60 | 65.16 | 2109.01 | 2.109 | 1.793 |
| 80 | 22.22 | 22.25 | 71.29 | 142.58 | 85.55 | 3172.41 | 3.172 | 2.696 |
| 90 | 25.00 | 25.00 | 90.00 | 180.00 | 108.00 | 4500.00 | 4.500 | 3.825 |
| 100 | 27.78 | 27.75 | 110.89 | 221.78 | 133.07 | 6154.40 | 6.154 | 5.231 |

Values assumed by the quantities expressed in (1.12) and in (1.13).

Actually, the total power of the fluid stream 4 is constituted not only by a kinetic part but also by a part that is due to the pressure, such that:

$$P^{tot} = P^{press} + P^{cin} \quad (1.14)$$

where:
"$P^{tot}$" is the total power of the fluid stream 4;
"$P^{press}$" is the pressure power of the fluid stream 4;
"$P^{cin}$" is the kinetic power of the fluid stream 4;

which, for the power of the fluid stream 4 (air at atmospheric pressure) at the intake section 14 of the conveyance channel 13, translates into:

$$P_A^{tot} = P_A^{press} + P_A^{cin} = P_{atm} A_A V_A + \tfrac{1}{2} \rho Q_A V_A^2 \quad (1.15)$$

where:
"$P_A^{tot}$" is the total power of the fluid stream 4 at the intake section 14 of the conveyance channel 13;
"$P_A^{press}$" is the pressure power of the fluid stream 4 at the intake section 14 of the conveyance channel 13;
"$P_A^{cin}$" is the kinetic power of the fluid stream 4 at the intake section 14 of the conveyance channel 13;
"$p^{atm}$" is the atmospheric pressure, i.e., the absolute pressure to which both the filling fluid 22 of the outside environment of the turbine 1a and the fluid stream 4 at the intake section 14 are subjected and is equal to 101325 Pa.

It should be noted that the pressure part of the power can be assessed both in terms of relative pressures, i.e., with "$p_{atm}=0$ Pa", and in terms of absolute pressures, i.e., with "$p_{atm}=101325$ Pa".

Table 1.6 reports the numerical values of the quantities expressed in (1.15) of the fluid stream 4 at the intake section 14 of the conveyance channel 13, which correspond to a series of values of average velocity "$V_0$" of the undisturbed flow that strikes the turbine 1a.

TABLE 1.6

Conveyance channel 13 with slots 25 open.

| $V_0$ [km/h] | $V_0$ [m/s] | $\rho$ [kg/m³] | $P_{atm}$ [Pa] | $P_A^{press}$ [W] | $P_A^{cin}$ [W] | $P_A^{tot}$ [W] | $P_A^{tot}$ [kW] |
|---|---|---|---|---|---|---|---|
| 10 | 2.78 | 1.2 | 101325 | 33802.02 | 1.53 | 33803.55 | 33.8 |
| 20 | 5.56 | 1.2 | 101325 | 67604.04 | 12.43 | 67616.47 | 67.62 |
| 30 | 8.33 | 1.2 | 101325 | 101284.47 | 41.65 | 101326.12 | 101.33 |
| 40 | 11.11 | 1.2 | 101325 | 135086.49 | 98.49 | 135184.98 | 135.18 |
| 50 | 13.89 | 1.2 | 101325 | 168888.51 | 193.35 | 169081.86 | 169.08 |
| 60 | 16.67 | 1.2 | 101325 | 202690.53 | 333.48 | 203024.01 | 203.02 |
| 70 | 19.44 | 1.2 | 101325 | 236370.96 | 528.28 | 236599.24 | 236.90 |
| 80 | 22.22 | 1.2 | 101325 | 270172.98 | 790.92 | 270963.90 | 270.96 |
| 90 | 25.00 | 1.2 | 101325 | 303975.00 | 1125.00 | 305100.00 | 305.10 |
| 100 | 27.78 | 1.2 | 101325 | 337777.02 | 1541.93 | 339318.95 | 339.3 |

Values assumed by the quantities expressed in (1.15) with the values of the pressures expressed in absolute values.

From the values reported in Table 1.6 it can be noted, in absolute terms, that the pressure part of the power of the fluid stream 4 at the intake section 14 of the conveyance channel 13 is considerably higher than the purely kinetic part of said power.

This should not be a surprise if one considers that the atmospheric pressure value is, as is known, a rather high value.

It is also true, however, that this pressure power value of a flow of fluid, as long as it remains such, is not usable for an energy exchange between a fluid and a machine, a process in which, as already noted, only the kinetic part of the power of a flow is involved.

The main operating mechanism of the turbine 1a according to the invention has been developed exactly on the basis of this observation, and thus uses a series of technical refinements that are aimed at increasing the kinetic power of the fluid stream 4 that interacts with the machine at the expense of pressure power, so as to be able to obtain, other conditions being equal, greater power levels at the shaft of the rotor 2 than existing machines, in which refinements of this type are not used.

More specifically, this goal is pursued by converting part of the pressure power of the fluid stream 4 into kinetic power and conveying fractions of the flow rate that are initially external to the machine toward the inside of the bodies of the machine.

As already mentioned earlier, these refinements comprise essentially in increasing the velocity at the expense of the pressure (as described by the Bernoulli's theorem applied to converging ducts in subsonic velocity conditions) and, once pressure values lower than those of the fluid environment that surrounds the machine have been induced inside the bodies of the machine, in drawing in from the outside given quantities of fluid flow rate toward the inside, through appropriate slots provided in the edges.

It is therefore clear that at the end of the assessments that follow, kinetic powers available for the interaction with the moving parts of the machine will be found which are even considerably higher than those available in the previous situation, with the slots closed.

With particular reference to FIGS. 5, 6, 7 and 8, assuming that the slots 23, 24 and 25 of the conveyance channel 13 of the distribution apparatus 3a and of the thrust duct 6 of the rotor 2 are to be considered open, consider a flow of incompressible fluid, assumed to be non-viscous, undisturbed, in a steady state, moving with an undisturbed average velocity "$V_0$", that strikes the turbine 1a along a direction that is radial to it.

At the intake section 14 of the conveyance channel 13, which indicates the intake section of the control volume that coincides with said conveyance channel 13, there are the same conditions as described previously, expressed in (1.1) and reported in Table 1.1.

Continuing in the conveyance channel 13, at the first slot 25, designated for the sake of simplicity by "$F_1$" and having an area "$A_{F1}$", there is a reduction in transverse cross-section due to the convergence of said conveyance channel 13, that leads to have in said transverse cross-section, designated for the sake of simplicity by "$S_1$" and having an area equal to "$A_1$":

$$Q_1 = Q_A; \ V_1 = Q_1/A_1; \ P_A + \tfrac{1}{2}\rho V_A^2 = p_1 + \tfrac{1}{2}\rho V_1^2 \quad (1.16)$$

where:
"$Q_1$" is the volumetric flow-rate of the fluid stream 4 at the section
"$S_1$" and is equal to "$Q_A$";
"$V_1$" is the average velocity of the fluid stream 4 at the section "$S_1$";
"$A_1$" is the projection of the section "$S_1$", in a direction at right angles to the flow, and is equal, for example, to 0.094 m² ($A_1 = 0.26$ m×0.36 m=0.094 m²);
"$p_1$" is the average pressure of the fluid stream 4 at the section "$S_1$";
from which the value of "$p_1$" is obtained.

By applying Bernoulli's theorem along one line of external flow of the conveyance channel 13, between one point at infinity and the slot "$F_1$", the following is obtained:

$$P_{atm} + \tfrac{1}{2}\rho V_0^2 = P_1 + \tfrac{1}{2}\rho V_{F1}^2; \ Q_{F1} = V_{F1} A_{F1} \quad (1.17)$$

where:
"$Q_{F1}$" is the volumetric flow-rate of the filling fluid 22 that flows through the slot "$F_1$";
"$V_{F1}$" is the average velocity of the filling fluid 22 that flows through the slot "$F_1$";
"$A_{F1}$" is the passage section that is defined by the slot "$F_1$" and is equal, for example, to 0.006 m² ($A_1 = 0.20$ m×0.03 m=0.006 m²).

Likewise, continuing in the conveyance channel 13, at the second slot 25, designated for the sake of simplicity by "$F_2$" and having an area "$A_{F2}$", there is a further reduction in transverse cross-section due to the convergence of said conveyance channel 13, which leads to having, in said transverse cross-section, designated for the sake of simplicity by "$S_2$" and having an area equal to "$A_2$":

$$Q_2 = Q_1 + Q_{F1}; \ V_2 = Q_2/A_2; \ P_A + \tfrac{1}{2}\rho V_A^2 = P_2 + \tfrac{1}{2}\rho V_2^2 \quad (1.18)$$

$$P_{atm} + \tfrac{1}{2}\rho V_0^2 = P_2 + \tfrac{1}{2}\rho V_{F2}^2; \ Q_{F2} = V_{F2} A_{F2} \quad (1.19)$$

where:
"$Q_2$" is the volumetric flow-rate of the fluid stream 4 at the section "$S_2$";
"$V_2$" is the average velocity of the fluid stream 4 at the section "$S_2$";
"$p_2$" is the average pressure of the fluid stream 4 at the section "$S_2$";
"$Q_{F2}$" is the volumetric flow-rate of the filling fluid 22 that flows through the slot "$F_2$";
"$V_{F2}$" is the average velocity of the filling fluid 22 that flows through the slot "$F_2$";
"$A_2$" is the projection of the section "$S_2$" in a direction at right angles to the flow and is equal, for example, to 0.082 m² ($A_1 = 0.24$ m×0.34 m=0.082 m²);
"$A_{F2}$" is the passage section formed by the slot "$F_2$" and is equal, for example, to 0.006 m² ($A_1 = 0.20$ m×0.03 m=0.006 m²).

The same is true, continuing in the conveyance channel 13, at the third slot 25.

Designating the set of three slots 25 for the sake of simplicity by "$F_3$" and as having an area "$A_{F3}$", there is a further reduction in transverse cross-section due to the convergence of said conveyance channel 13, which leads to having, in this transverse cross-section, designated for the sake of simplicity by "$S_3$" and having an area equal to "$A_3$":

$$Q_3 = Q_2 + Q_{F2}; \ V_3 = Q_3/A_3; \ P_A + \tfrac{1}{2}\rho V_A^2 = P_3 + \tfrac{1}{2}\rho V_{3\,hu\,2} \quad (1.20)$$

$$P_{atm} + \tfrac{1}{2}\rho V_0^2 = P_3 + \tfrac{1}{2}\rho V_{F3}^2; \ Q_{F3} = V_{F3} A_{F3} \quad (1.21)$$

where:
"$Q_3$" is the volumetric flow-rate of the fluid stream 4 at the section "$S_3$";
"$V_3$" is the average velocity of the fluid stream 4 at the section "$S_3$";
"$p_3$" is the average pressure of the fluid stream 4 at the section "$S_3$";
"$Q_{F3}$" is the volumetric flow-rate of the filling fluid 22 that flows through the slot "$F_3$";
"$V_{F3}$" is the average velocity of the filling fluid 22 that flows through the slot "$F_3$";
"$A_3$" is the projection of the section "$S_3$", in a direction at right angles to the flow and is equal, for example, to 0.070 m² ($A_1 = 0.22$ m×0.32 m=0.082 m²);
"$A_{F3}$" is the passage section defined by the slot "$F_3$" and is equal, for example, to 0.006 m² ($A_1 = 0.20$ m×0.03 m=0.006 m²).

At the outlet section 16 of the conveyance channel 13, which indicates the outlet section of the control volume that coincides with said conveyance channel 13, the following apply:

$$Q_B = Q_3 + Q_{F3}; \ V_B = Q_B/A_B; \ P_A + \tfrac{1}{2}\rho V_A^2 = P_B + \tfrac{1}{2}\rho V_B^2 \quad (1.22)$$

$$M_B = \rho Q_B V_B; \ P^{cin} = \tfrac{1}{2} Q_B V_B^2 \quad (1.23)$$

Table 1.7 reports the numerical values of the quantities expressed in (1.22) and in (1.23) of the fluid stream 4 at the outlet section 16 of the conveyance channel 13, which correspond to a series of values of average velocity "$V_0$" of the undisturbed flow that strikes the turbine 1a.

TABLE 1.7

Conveyance channel 13 with slots 25 open.

| $V_0$ [km/h] | $V_0$ [m/s] | $p_B$ [Pa] | $V_B$ [m/s] | $A_B$ [m²] | $Q_B$ [m³/s] | $M_B$ [N] | $P_B^{cin}$ [W] | $P_B^{cin}$ [kW] |
|---|---|---|---|---|---|---|---|---|
| 10 | 2.78 | 101302 | 6.77 | 0.06 | 0.41 | 3.30 | 11.18 | 0.011 |
| 20 | 5.56 | 101235 | 13.47 | 0.06 | 0.81 | 13.07 | 88.03 | 0.088 |
| 30 | 8.33 | 101123 | 20.17 | 0.06 | 1.21 | 29.30 | 295.48 | 0.295 |
| 40 | 11.11 | 100966 | 26.87 | 0.06 | 1.61 | 51.99 | 698.47 | 0.698 |
| 50 | 13.89 | 100765 | 33.57 | 0.06 | 2.01 | 81.14 | 1361.92 | 1.362 |
| 60 | 16.67 | 100519 | 40.27 | 0.06 | 2.42 | 116.75 | 2350.76 | 2.351 |

TABLE 1.7-continued

Conveyance channel 13 with slots 25 open.

| $V_0$ [km/h] | $V_0$ [m/s] | $p_B$ [Pa] | $V_B$ [m/s] | $A_B$ [m$^2$] | $Q_B$ [m$^3$/s] | $M_B$ [N] | $P_B^{cin}$ [W] | $P_B^{cin}$ [kW] |
|---|---|---|---|---|---|---|---|---|
| 70 | 19.44 | 100228 | 46.97 | 0.06 | 2.82 | 158.83 | 3729.94 | 3.730 |
| 80 | 22.22 | 99893 | 53.67 | 0.06 | 3.22 | 207.37 | 5564.37 | 5.564 |
| 90 | 25.00 | 99514 | 60.37 | 0.06 | 3.62 | 262.37 | 7918.99 | 7.919 |
| 100 | 27.78 | 99089 | 67.06 | 0.06 | 4.02 | 323.83 | 10858.74 | 10.859 |

Values assumed by the quantities expressed in (1.22) and in (1.23) at the outlet section 16 of the conveyance channel 13 with the values of the pressures expressed in absolute values.

If one now compares the values reported by Table 1.7 with those of Table 1.2, related to the characteristic quantities of the outlet section 16 of the conveyance channel 13, one can notice that in the configuration in which the slots 25 are open, the flow-rate, the average velocity, the momentum flow and consequently the kinetic power of the flow at the outlet section 16 of the conveyance channel 13 are considerably higher than the corresponding quantities in the configuration in which the slots 25 are closed.

Therefore, a first effect that is achieved is that, other conditions being equal, in the case of a conveyance channel 13 with open slots 25, a flow with a kinetic power that is higher than the one of the previous situation begins its process of interaction with the walls of the thrust duct 6 of the rotor 2.

As already assumed for the previous case, for better comprehension of the quantity of kinetic energy that the fluid stream 4 has at the inlet of the thrust duct 6, it is assumed here that the rotor 2 is fixed with respect to the distribution apparatus 3a, i.e., cannot rotate with respect to it.

At the intake section 9 of the thrust duct 6, which indicates the intake section of the control volume that coincides with said thrust duct 6, the following apply:

$$Q_C=Q_B; V_C=V_B; P_C=P_B; M_C=\rho Q_C V_C^2 \qquad (1.24)$$

Table 1.8 reports the numerical values of the quantities expressed in (1.24) of the fluid stream 4 at the inlet section 9 of the thrust duct 6, which correspond to a series of values of average velocity "$V_0$" of the undisturbed flow that strikes the turbine 1a.

TABLE 1.8

Thrust duct 6 with slots 23 and 24 open.

| $V_0$ [km/h] | $V_0$ [m/s] | $Q_C=Q_B$ [m$^3$/s] | $V_C=V_B$ [m/s] | $p_C=p_B$ [Pa] | $M_C=M_B$ [N] | $P_C^{cin}=P_B^{cin}$ [W] | $P_C^{cin}=P_B^{cin}$ [kW] |
|---|---|---|---|---|---|---|---|
| 10 | 2.78 | 0.41 | 6.77 | 101302 | 3.30 | 11.18 | 0.011 |
| 20 | 5.56 | 0.81 | 13.47 | 101235 | 13.07 | 88.03 | 0.088 |
| 30 | 8.33 | 1.21 | 20.17 | 101123 | 29.30 | 295.48 | 0.295 |
| 40 | 11.11 | 1.61 | 26.87 | 100966 | 51.99 | 698.47 | 0.698 |
| 50 | 13.89 | 2.01 | 33.57 | 100765 | 81.14 | 1361.92 | 1.362 |
| 60 | 16.67 | 2.42 | 40.27 | 100519 | 116.75 | 2350.76 | 2.351 |
| 70 | 19.44 | 2.82 | 46.97 | 100228 | 158.83 | 3729.94 | 3.730 |
| 80 | 22.22 | 3.22 | 53.67 | 99893 | 207.37 | 5564.37 | 5.564 |
| 90 | 25.00 | 3.62 | 60.37 | 99514 | 262.37 | 7918.99 | 7.919 |
| 100 | 27.78 | 4.02 | 67.06 | 99089 | 323.83 | 10858.74 | 10.859 |

Values assumed by the quantities expressed in (1.24) with the values of the pressures expressed in absolute values.

Continuing into the thrust duct 6, at the first slot 23, designated for the sake of simplicity by "$F_4$" and having an area "$A_{F4}$", there is a reduction in transverse cross-section due to the convergence of said thrust duct 6, which leads to having in said transverse cross-section, designated for the sake of simplicity by "$S_4$" and having an area equal to "$A_4$":

$$Q_4=Q_C; V_4=Q_4/A_4; P_C+\tfrac{1}{2}\rho V_C^2=P_4+\tfrac{1}{2}\rho V_4^2 \qquad (1.25)$$

where:
"$Q_4$" is the volumetric flow rate of the fluid stream 4 at the section "$S_4$" and is equal to "$Q_C$";
"$V_4$" is the average velocity of the fluid stream 4 at the section "$S_4$";
"$A_4$" is the projection of the section "$S_4$", in a direction at right angles to the flow, and is equal, for example, to 0.050 m$^2$ ($A_4$=0.20 m×0.25 m=0.050 m$^2$);
"$p_4$" is the average pressure of the fluid stream 4 at the section "$S_4$";
from which the value of "$p_4$" is obtained.

By applying Bernoulli's theorem along an external flow line of the conveyance channel 13, between a point at infinity and the section "$S_4$", assuming "$V_0$=0", the following is obtained:

$$P_{atm}=P_4+\tfrac{1}{2}\rho V_{F4}^2; Q_{F4}=V_{F4}A_{F4} \qquad (1.26)$$

where:
"$Q_{F4}$" is the volumetric flow rate of the filling fluid 22 that flows through the slot "$F_4$";
"$V_{F4}$" is the average velocity of the filling fluid 22 that flows through the slot "$F_4$";
"$A_{F4}$" is the passage section that is formed by the slot "$F_4$" and is equal, for example, to 0.002 m$^2$ ($A_{F4}$=0.10 m×0.02 m=0.02 m$^2$).

Likewise, continuing in the thrust duct 6, at the second slot 23, designated for the sake of simplicity by "$F_5$" and having an area "$A_{F5}$", with a transverse cross-section, designated for the sake of simplicity by "$S_5$" and having an area equal to "$A_5$", the following is obtained:

$$Q_5=Q_4+Q_{F4}; V_5=Q_5/A_5; P_C+\tfrac{1}{2}\rho V_C^2 32\ P_5+\tfrac{1}{2}\rho V_5^2 \qquad (1.27)$$

$$P_{atm}=P_5+\tfrac{1}{2}\rho V_{F5}^2; Q_{F5}=V_{F5}A_{F5} \qquad (1.28)$$

where:
"$Q_5$" is the volumetric flow rate of the fluid stream 4 at the section
"$V_5$" is the average velocity of the fluid stream 4 at the section "$S_5$";
"$p_5$" is the average pressure of the fluid stream 4 at the section "$S_5$";
"$Q_{F5}$" is the volumetric flow rate of the filling fluid 22 that flows through the slot "$F_5$";
"$V_{F5}$" is the average velocity of the filling fluid 22 that flows through the slot "$F_5$";
"$A_5$" is the projection of the section "$S_5$", in a direction at right angles to the flow, and is equal, for example, to 0.050 m$^2$ ($A_5$=0.20 m×0.25 m=0.050 m$^2$);
"$A_{F5}$" is the passage section that is formed by the slot "$F_5$" and is equal, for example, to 0.002 m$^2$ ($A_{F5}$=0.10 m×0.02 m=0.002 m$^2$).

Continuing in the thrust duct 6, one encounters respectively the third slot 23 and the three slots 24, respectively, designated for the sake of simplicity by "$F_6$", "$F_7$", "$F_8$" and "$F_9$" and respectively having areas "$A_{F6}$", "$A_{F7}$", "$A_{F8}$" and "$A_{F9}$", respectively, with a transverse cross-section, designated for the sake of simplicity by "$S_6$", "$S_7$", "$S_8$" and "$S_9$", and having an area equal to "$A_6$", "$A_7$", "$A_8$" e "$A_9$", the following apply:

$$Q_6=Q_5+Q_{F5}; \; V_6=Q_6/A_6; \; P_C+\tfrac{1}{2}\rho V_C^2=P_6+\tfrac{1}{2}\rho V_6^2 \qquad (1.29)$$

$$P_{atm}=P_6+\tfrac{1}{2}\rho V_{F6}^2; \; Q_{F6}=V_{F6}A_{F6} \qquad (1.30)$$

where:
- "$Q_6$" is the volumetric flow rate of the fluid stream 4 at the section "$S_6$";
- "$V_6$" is the average velocity of the fluid stream 4 at the section "$S_6$";
- "$p_6$" is the average pressure of the fluid stream 4 at the section "$S_6$";
- "$Q_{F6}$" is the volumetric flow rate of the filling fluid 22 that flows through the slot "$F_6$";
- "$V_{F6}$" is the average velocity of the filling fluid 22 that flows through the slot "$F_6$";
- "$A_6$" is the projection of the section "$S_6$", in a direction at right angles to the flow, and is equal, for example, to 0.050 m² ($A_6$=0.20 m×0.25 m=0.050 m²);
- "$A_{F6}$" is the passage section defined by the slot "$F_6$" and is equal, for example, to 0.002 m² ($A_{F6}$=0.10 m×0.02 m=0.002 m²);

$$Q_7=Q_6+Q_{F6}; \; V_7=Q_7/A_7; \; P_C+\tfrac{1}{2}\rho V_C^2 32 \; P_7+\tfrac{1}{2}\rho V_7^2 \qquad (1.31)$$

$$P_{atm}=P_7+\tfrac{1}{2}\rho V_{F7}^2; \; Q_{F7}=V_{F7}A_{F7} \qquad (1.32)$$

where:
- "$Q_7$" is the volumetric flow rate of the fluid stream 4 at the section "$S_7$";
- "$V_7$" is the average velocity of the fluid stream 4 at the section "$S_7$";
- "$p_7$" is the average pressure of the fluid stream 4 at the section "$S_7$";
- "$Q_{F7}$" is the volumetric flow rate of the filling fluid 22 that flows through the slot "$F_7$";
- "$V_{F7}$" is the average velocity of the filling fluid 22 that flows through the slot "$F_7$";
- "$A_7$" is the projection of the section "$S_7$", in a direction at right angles to the flow, and is equal, for example, to 0.050 m² ($A_7$=0.20 m×0.25 m=0.050 m²);
- "$A_{F7}$" is the passage section that is formed by the slot "$F_7$" and is equal, for example, to 0.002 m² ($A_{F7}$=0.10 m×0.02 m=0.002 m²);

$$Q_8=Q_7+Q_{F7}; \; V_8=Q_8/A_8; \; P_C+\tfrac{1}{2}\rho V_C^2=P_8+\tfrac{1}{2}\rho V_8^2 \qquad (1.33)$$

$$P_{atm}=P_8+\tfrac{1}{2}\rho V_{F8}^2; \; Q_{F8}=V_{F8}A_{F8} \qquad (1.34)$$

where:
- "$Q_8$" is the volumetric flow rate of the fluid stream 4 at the section "$S_8$".
- "$V_8$" is the average velocity of the fluid stream 4 at the section "$S_8$";
- "$p_8$" is the average pressure of the fluid stream 4 at the section "$S_8$";
- "$Q_{F8}$" is the volumetric flow-rate of the filling fluid 22 that flows through the slot "$F_8$";
- "$V_{F8}$" is the average velocity of the filling fluid 22 that flows through the slot "$F_8$";
- "$A_8$" is the projection of the section "$S_8$", in a direction at right angles to the flow, and is equal, for example, to 0.050 m² ($A_8$=0.20 m×0.25 m=0.050 m²);
- "$A_{F8}$" is the passage section that is formed by the slot "$F_8$" and is equal, for example, to 0.002 m² ($A_{F8}$=0.10 m×0.02 m=0.002 m²).

$$Q_9=Q_8+Q_{F8}; \; V_9=Q_9/A_9; \; P_C+\tfrac{1}{2}\rho V_C^2=P_9+\tfrac{1}{2}\rho V_9^2 \qquad (1.35)$$

$$P_{atm}=P_9+\tfrac{1}{2}\rho V_{F9}^2; \; Q_{F9}=V_{F9}A_{F9} \qquad (1.36)$$

where:
- "$Q_9$" is the volumetric flow rate of the fluid stream 4 at the section "$S_9$";
- "$V_9$" is the average velocity of the fluid stream 4 at the section "$S_9$";
- "$p_9$" is the average pressure of the fluid stream 4 at the section "$S_9$";
- "$Q_{F9}$" is the volumetric flow-rate of the filling fluid 22 that flows through the slot "$F_9$";
- "$V_{F9}$" is the average velocity of the filling fluid 22 that flows through the slot "$F_9$";
- "$A_9$" is the projection of the section "$S_9$", in a direction at right angles to the flow, and is equal, for example, to 0.050 m² ($A_9$=0.20 m×0.25 m=0.050 m²);
- "$A_{F9}$" is the passage section that is formed by the slot "$F_9$" and is equal, for example, to 0.002 m² ($A_{F9}$=0.10 m×0.02 m=0.002 m²).

At the outlet section 11, which indicates the outlet section of the control volume that coincides with said thrust duct 6, the following apply:

$$Q_D=Q_9+Q_{F9}; \; V_D=Q_D/A_D; \; P_C+\tfrac{1}{2}\rho V_C^2=P_D+\tfrac{1}{2}\rho V_D^2 \qquad (1.37)$$

$$M_D=\rho Q_D V_D; \; P_D^{cin}=\tfrac{1}{2}\rho Q_D V_D^2 \qquad (1.38)$$

Table 1.9 reports the numerical values of the quantities expressed in (1.37) and in (1.38), which correspond to a series of values of average velocity "$V_0$" of the undisturbed flow that strikes the turbine 1a.

TABLE 1.9

| | | | Thrust duct 6 with slots 23 and 24 open. | | | | | |
|---|---|---|---|---|---|---|---|---|
| $V_0$ [km/h] | $V_0$ [m/s] | $Q_D$ [m³/s] | $A_D$ [m²] | $V_D$ [m/s] | $p_D$ [Pa] | $M_D$ [N] | $P_D^{cin}$ [W] | $P_D^{cin}$ [kW] |
| 10 | 2.78 | 0.51 | 0.06 | 8.46 | 101287 | 5.16 | 21.83 | 0.022 |
| 20 | 5.56 | 1.01 | 0.06 | 16.84 | 101173 | 20.42 | 171.98 | 0.172 |
| 30 | 8.33 | 1.51 | 0.06 | 25.22 | 100985 | 45.79 | 577.44 | 0.577 |
| 40 | 11.11 | 2.02 | 0.06 | 33.60 | 100722 | 81.27 | 1365.23 | 1.365 |
| 50 | 13.89 | 2.52 | 0.06 | 41.97 | 100383 | 126.85 | 2662.33 | 2.662 |
| 60 | 16.67 | 3.02 | 0.06 | 50.35 | 99970 | 182.54 | 4595.74 | 4.596 |
| 70 | 19.44 | 3.52 | 0.06 | 58.73 | 99482 | 248.34 | 7292.46 | 7.292 |
| 80 | 22.22 | 4.03 | 0.06 | 67.11 | 98919 | 324.24 | 10879.50 | 10.879 |
| 90 | 25.00 | 4.53 | 0.06 | 75.48 | 98281 | 410.25 | 15483.84 | 15.484 |
| 100 | 27.78 | 5.03 | 0.06 | 83.86 | 97568 | 506.37 | 21232.49 | 21.232 |

Values assumed by the quantities expressed in (1.37) and in (1.38) with the values of the pressures expressed in absolute values.

Comparing the values reported in Table 1.9 with those of Table 1.3, related to the characteristic quantities of the outlet section 11 of the thrust duct 6, it is noted that, in the configuration in which the slots 23, 24 and 25 are open, the flow-rate, the average velocity, the momentum flow and consequently the kinetic power of the flow at the outlet section 11 of the thrust duct 6 are considerably higher than the corresponding quantities in the configuration in which the slots 23, 24 and 25 are closed.

Therefore, the additional effect achieved is that, other conditions being equal, in the case of thrust ducts 6 with open slots 23, 24 and 25 of the conveyance channel 13, a flow with a kinetic power higher than the one of the situation with closed slots 23, 24 and 25 interacts with the walls of the thrust duct 6.

The thrust discharged by the fluid stream 4 onto the walls of the thrust duct 6 of the rotor 2 is now calculated, under the assumption that the latter cannot rotate with respect to the distribution apparatus 3a.

For this purpose, the momentum equation is applied to a control volume that coincides with said thrust duct 6. This equation, projected along the direction that is tangential to the rotor 2, gives:

$$S = M_C - M_D \cos\theta = \rho Q_C V_C - \rho Q_C V_D \cos\theta = \rho Q_C V_C + \rho Q_D V_D \quad (1.38)$$

One thus obtains a thrust value which is very high and in particular equal to more than twice the momentum flow that enters the thrust ducts, by way of the redirection by 180° of the flow between the intake section 9 and the outlet section 11 of the thrust duct 6 and of the flow rate of the filling fluid 22 that enters from the slots 23, 24 and 25.

The corresponding momentum at a possible shaft inserted so as to be jointly connected in the hub of the rotor 2, again under the assumption that the latter cannot rotate with respect to the distribution apparatus 3a, is given by:

$$T_{al} = SR \quad (1.39)$$

Table 1.10 reports the numerical values of the quantities expressed in (1.38) and in (1.39) that correspond to a series of values of average velocity "$V_0$" of the undisturbed flow that strikes the turbine 1a.

TABLE 1.10

Thrust duct 6 with slots 23 and 24 open.

| $V_0$ [km/h] | $\rho$ [kg/m³] | $V_0$ [m/s] | R [m] | $M_C$ [N] | $M_D$ [N] | S [N] | $T_{al}$ [N*m] |
|---|---|---|---|---|---|---|---|
| 10 | 1.2 | 2.78 | 0.60 | 3.30 | 5.16 | 8.46 | 5.08 |
| 20 | 1.2 | 5.56 | 0.60 | 13.07 | 20.42 | 33.49 | 20.09 |
| 30 | 1.2 | 8.33 | 0.60 | 29.30 | 45.79 | 75.09 | 45.05 |
| 40 | 1.2 | 11.11 | 0.60 | 51.99 | 81.27 | 133.26 | 79.96 |
| 50 | 1.2 | 13.89 | 0.60 | 81.14 | 126.85 | 207.99 | 124.79 |
| 60 | 1.2 | 16.67 | 0.60 | 116.75 | 182.54 | 299.29 | 179.57 |
| 70 | 1.2 | 19.44 | 0.60 | 158.83 | 248.34 | 407.17 | 244.30 |
| 80 | 1.2 | 22.22 | 0.60 | 207.37 | 324.24 | 531.61 | 318.97 |
| 90 | 1.2 | 25.00 | 0.60 | 262.37 | 410.25 | 672.62 | 403.57 |
| 100 | 1.2 | 27.78 | 0.60 | 323.83 | 506.37 | 830.20 | 498.12 |

Values assumed by the quantities expressed in (1.38) and in (1.39) with the values of the pressures expressed as absolute values.

Comparing the values reported in Table 1.10 with those of Table 1.4, it can be noted that in the configuration of the turbine 1a in which the slots 23, 24 and 25 are open, other conditions being equal, the momentum transmitted to the shaft in the condition in which the rotor 2 is fixed with respect to the distribution apparatus 3a is considerably greater than the corresponding value in the configuration in which the slots 23, 24 and 25 are closed.

Differently from what has been described so far, it is assumed now that the fluid stream, in coming out from the outlet section 16 of the conveyance channel 13 of the distribution apparatus 3a, enters the thrust ducts 6 of the rotor 2 with the latter being free to rotate about its own rotation axis 5, with angular and tangential velocity according to the following expressions:

$$U = \omega R; \quad \omega = 2\pi n/60 \quad (1.40)$$

At the intake section 9 of the thrust duct 6 of the rotor 2, the following apply:

$$V_C^R = V_C - U; M_C = \rho Q_C V_C^R = \rho Q_C (V_C - U) \quad (1.41)$$

At the outlet section 11 of the thrust duct 6 of the rotor 2, the following apply:

$$V_D^R = V_D - U; M_D = \rho Q_D V_D^R = \rho Q_D (V_D - U) \quad (1.42)$$

The rotary thrust discharged by the fluid stream onto the walls of the thrust duct 6 of the rotor that is free to rotate is thus equal to:

$$S = M_C - M_D \cos\theta = \rho Q_C V_C^R + \rho Q_D V_D^R = \rho Q_C (V_C - U) + \rho Q_D (V_D - U) \quad (1.43)$$

One thus obtains again a value of the rotary thrust which is very high and in particular is equal to more than twice the momentum flow that enters the thrust duct 6 of the rotor 2, which is free to rotate due to the redirection by 180° of the fluid stream 4 between the intake and the outlet of the thrust duct 6 and due to the flow rate of the filling fluid 22 that enters from the slots 23, 24 and 25.

In view of what has been described, the momentum at a possible shaft inserted so as to be jointly connected to the hub of the rotor 2 and the theoretical power that can be obtained thereat are equal to:

$$T_{al} = SR = \rho R [Q_C(V_C - U) + Q_D(V_D - U)] \quad (1.44)$$

$$P_{teor} = SU = T_{al}\omega = \rho U [Q_C(V_C - U) + Q_D(V_D - U)] \quad (1.45)$$

whose maximum values are obtained when $U = V_C/2$.

The effective power that can be obtained at the shaft differs from expression (1.45) for the efficiency "$\eta$", therefore:

$$P_{eff} = \eta P_{teor} \quad (1.46)$$

A realistic value to be assumed for the efficiency can be indicatively "$\eta = 0.85$".

Table 1.11 reports the numerical values of the quantities expressed from (1.43) to (1.46), which correspond to a series of values of average velocity "$V_0$" of the undisturbed flow that strikes the turbine 1a.

The numerical example reported relates to the first embodiment 1a of the high-performance turbine according to the invention.

However, the same numerical example is valid for understanding the operation of the second embodiment 1b of the high-performance turbine according to the invention. Obviously, by changing the geometry of the distribution apparatus 3b with respect to the distribution apparatus 3a, the final numerical results will change.

TABLE 1.11

Thrust duct 6 with slots 23 and 24 open.

| $V_0$ [km/h] | $U = (V_C/2)$ [m/s] | $M_C$ [N] | $M_D$ [N] | S [N] | $T_{al}$ [N*m] | $P_{teor}$ [W] | $P_{teor}$ [kW] | $P_{eff}$ [kW] |
|---|---|---|---|---|---|---|---|---|
| 10 | 3.39 | 1.67 | 3.10 | 4.77 | 2.86 | 16.17 | 0.016 | 0.014 |
| 20 | 6.74 | 6.55 | 12.24 | 18.79 | 11.27 | 126.64 | 0.127 | 0.108 |
| 30 | 10.09 | 14.65 | 27.42 | 42.07 | 25.24 | 424.49 | 0.424 | 0.360 |
| 40 | 13.44 | 25.97 | 48.87 | 74.84 | 44.90 | 1005.85 | 1.006 | 0.855 |
| 50 | 16.79 | 40.50 | 76.14 | 116.64 | 69.98 | 1958.39 | 1.958 | 1.664 |
| 60 | 20.14 | 58.49 | 109.48 | 167.97 | 100.78 | 3382.92 | 3.383 | 2.876 |
| 70 | 23.49 | 79.49 | 148.85 | 228.34 | 137.00 | 5363.71 | 5.364 | 4.560 |
| 80 | 26.84 | 103.71 | 194.75 | 298.46 | 179.08 | 8010.67 | 8.011 | 6.809 |
| 90 | 30.19 | 131.15 | 246.20 | 377.35 | 226.41 | 11392.20 | 11.392 | 9.683 |
| 100 | 33.53 | 161.75 | 303.79 | 465.54 | 279.32 | 15609.56 | 15.610 | 13.269 |

Values assumed by the quantities expressed from (1.43) to (1.46) with the values of the pressures expressed as absolute values.

In practice it has been found that the high-performance turbine, particularly with increased specific power, according to the present invention fully achieves the intended aim, because it makes it possible to have, at each point of operation thereof, a variable fluid flow rate, which in particular rises with respect to the value of the fluid flow rate that enters from the intake sections, both of the distribution apparatus and in the ducts of the rotor.

As previously described, the increase in flow rate in the different parts of the machine is provided by drawing in fluid flow rate from the surrounding fluid environment through appropriate openings, and this drawing in is made possible by the fact that the machine operates in a condition in which the values of the flow pressure, both inside the distribution apparatus and in the ducts of the rotor, are lower than the pressure value that characterizes the external fluid environment.

In this manner the power that can be obtained at the shaft of the rotor, besides depending on the density of the fluid that is used and minus the efficiency of the apparatus, no longer depends only on the fluid flow rate and on the average velocity of the intake flow at the initial sections, but depends also on the flow-rate values drawn from the outside environment by way of the pressure difference that exists between the inside and the outside of the machine.

In its path inside the various parts of the turbine, the flow rate and the average velocity on the flow section in fact increase and thus the power that can be obtained at the rotating shaft increases as well.

More precisely, by way of the path followed by the fluid stream in the single thrust duct of the rotor, the angle between the direction of the momentum flow that enters through the intake section of the control volume and the one that exits through the outlet section of the same control volume is equal to 180°. This angle involves the maximum value of the rotary thrust discharged by the fluid stream to the walls of the thrust duct in its passage through said duct.

Owing to particular constructive requirements, in a hypothetical variation of the high-performance turbine according to the invention, the angle between the direction of the intake momentum flow and the outlet direction may be smaller than 180°, consequently entailing a rotary thrust value that is smaller than the one that corresponds to the two embodiments of the high-performance turbine according to the invention.

Since the fluid stream that travels through the thrust duct is an internal flow in partial vacuum, the presence of open slots for the inflow of additional flow-rate from the outside environment makes it possible to utilize the pressure energy of the outside environment, which adds to the kinetic energy of the fluid stream that interacts with the high-performance turbine according to the invention.

In this manner it is possible to increase considerably the performance of the high-performance turbine, according to the invention, with respect to the background art. In fact, in terms of its performance, the high-performance turbine according to the invention stands out with respect to existing types of turbine not only in relative terms due to the high performance but also in absolute terms in that it is capable of delivering considerably higher power levels, both in relation to its general physical dimensions and in relation to the values of the energy or power of the flow entering the initial intake section of the distribution apparatus, and this occurs even starting from relatively low values of intake flow velocity.

Therefore, the dimensions of the high-performance turbine according to the present invention are considerably smaller than those of turbines of the known type, for an equal power to be achieved at the shaft.

Accordingly, an overall convenience, in addition to remarkable savings in terms of construction costs, installation costs and management costs and of to occupied space, is associated with use of the high-performance turbine according to the present invention.

The high-performance turbine particularly with increased specific power according to the present invention is susceptible of numerous modifications and variations, all of which are within the scope of the appended claims.

All the details may furthermore be replaced with other technically equivalent elements.

In practice, the materials used, as long as they are compatible with the specific use, as well as the contingent shapes and dimensions, may be any according to requirements and to the state of the art.

The disclosures in Italian Patent Application No. MI2009A001997 from which this application claims priority are incorporated herein by reference.

The invention claimed is:

1. A high-performance turbine, particularly with increased specific power, comprising
a rotor and
a distribution apparatus which is adapted to convey a fluid stream onto said rotor for its rotation about its rotation axis,
said rotor comprising a plurality of thrust ducts adapted to receive said fluid stream conveyed by said distribution apparatus to generate a rotary thrust on the surrounding walls of said thrust ducts,
further comprising at least one slot, which is formed on the walls of said thrust ducts and/or of said distribution apparatus and is adapted to connect said fluid stream to the environment outside the turbine, at least one of said thrust ducts and said distribution apparatus crossed by said fluid stream comprising at least one portion that converges in a direction in which said fluid stream travels, which is defined upstream of said at least one slot in the direction of travel of said fluid stream for the at least local lowering of pressure inside said thrust ducts and/or said distribution apparatus, which are crossed by said fluid stream, below a value of a pressure of a filling fluid of said outside environment, with consequent suction of said filling fluid into said thrust ducts and/or said distribution apparatus, which are crossed by said fluid stream, wherein said rotor comprises a circular and substantially cylindrical body delimited by a first flat portion and a second flat portion, said thrust ducts being formed between said first flat portion and said second flat portion and being arranged evenly with respect to each other according to an angular sequence that is defined with respect to said rotation axis.

2. A The turbine according to claim 1, wherein each one of said thrust ducts extends from an intake section of said rotor formed on the outer lateral surface of said rotor proximate to said first flat portion to an outlet section of said rotor that is formed on said outer lateral surface of said rotor proximate to said second flat portion, each one of said thrust ducts comprising, in the direction of travel of said fluid stream, a first curvilinear portion, which runs substantially parallel to said first flat portion with a curvature that matches the direction of rotation of said rotor, and a second curvilinear portion, which is symmetrical to said first curvilinear portion with respect to a plane of radial symmetry of said rotor which is substantially perpendicular to said rotation axis, said first curvilinear portion and said second curvilinear portion being mutually connected by means of a rectilinear portion that runs parallel to said rotation axis and is formed proximate to said rotation axis.

3. The turbine according to claim 2, wherein said first curvilinear portion and said second curvilinear portion extend respectively from said intake section of said rotor and from said outlet section of said rotor substantially tangentially to said outer lateral surface of said rotor, both ending in said substantially rectilinear portion with a direction that is substantially radial with respect to said rotation axis.

4. The turbine according to claim 3, wherein each one of said first curvilinear portions of said thrust ducts at least partly converges along the direction of travel of said fluid stream.

5. The turbine according to claim 2, further comprising, for each one of said thrust ducts, a first plurality of slots formed in said first flat portion at said first curvilinear portion and oriented substantially radially with respect to said rotation axis.

6. The turbine according to claim 5, further comprising, for each one of said thrust ducts, a second plurality of slots formed in said second flat portion at said second curvilinear portion and oriented substantially radially with respect to said rotation axis.

7. The turbine according to claim 5, wherein said distribution apparatus comprises a body shaped substantially like a hollow cylinder which is radially external to said rotor and has a face that is substantially coplanar to said first flat portion and forms a plurality of conveyance channels that run substantially radially to said rotation axis, said conveyance channels being arranged evenly with respect to each other according to an angular sequence that is defined with respect to said rotation axis.

8. The turbine according to claim 7, wherein each one of said conveyance channels extends along a direction that is inclined with respect to the radial direction concordantly with the direction of rotation of said rotor for the conveyance of said fluid stream in said thrust ducts along a direction that is at least partially tangent to said rotor, each one of said conveyance channels extending from an intake section of said distribution apparatus that is formed on the outer lateral surface of said distribution apparatus to an outlet section of said distribution apparatus that corresponds to one of said intake sections of said rotor and is formed on the internal lateral surface of said distribution apparatus, each one of said conveyance channels at least partly converging in the direction of travel of said fluid stream.

9. The turbine according to claim 7, further comprising, for each one of said conveyance channels at said converging part of said conveyance channel, a third plurality of slots, which are formed in the walls of said distribution apparatus and are oriented substantially tangentially to said rotation axis.

10. The turbine according to claim 7, wherein said distribution apparatus comprises a plurality of conveyance ducts, which run substantially along a single preferred direction, each one of said conveyance ducts converging at least partially along the direction of travel of said fluid stream.

11. The turbine according to claim 10, wherein said conveyance ducts extend from intake sections of said distribution apparatus to a plurality of outlet sections of said distribution apparatus which correspond to some of said intake sections of said rotor along a direction that is inclined with respect to the radial direction concordantly with the direction of rotation of said rotor for the conveyance of said fluid stream in said thrust ducts along a direction that is at least partially tangent to said rotor.

12. The turbine according to claim 10, further comprising, for each one of said conveyance ducts, at said converging part of said conveyance duct, a fourth plurality of slots formed in the walls of said distribution apparatus and oriented substantially tangentially to said rotation axis.

\* \* \* \* \*